US008891456B2

(12) United States Patent  
Sakoda et al.

(10) Patent No.: US 8,891,456 B2  
(45) Date of Patent: Nov. 18, 2014

(54) WIRELESS COMMUNICATION SYSTEM, WIRELESS COMMUNICATION DEVICE AND WIRELESS COMMUNICATION METHOD, AND COMPUTER PROGRAM

(75) Inventors: Kazuyuki Sakoda, Tokyo (JP); Hideki Iwami, Saitama (JP); Kenzo Nishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 917 days.

(21) Appl. No.: 12/044,555

(22) Filed: Mar. 7, 2008

(65) Prior Publication Data

US 2008/0151860 A1 Jun. 26, 2008

Related U.S. Application Data

(62) Division of application No. 10/916,596, filed on Aug. 12, 2004, now Pat. No. 8,274,961.

(30) Foreign Application Priority Data

Oct. 24, 2003 (JP) ................................. 2003-364231

(51) Int. Cl.
*H04W 4/00* (2009.01)
*H04W 74/08* (2009.01)

(52) U.S. Cl.
CPC .................................. *H04W 74/0816* (2013.01)
USPC ............ 370/329; 370/443; 455/522; 709/204

(58) Field of Classification Search
CPC . H04W 74/0816; H04W 84/12; H04W 74/08; H04W 84/18; H04W 16/14
USPC .................. 370/329, 333, 441, 389, 443–445, 370/465–468, 395.4; 455/522; 709/204, 709/250; 725/135
See application file for complete search history.

(56) References Cited

U.S. PATENT DOCUMENTS 5,524,110 A * 6/1996 Danneels et al. ............. 709/204
5,592,483 A * 1/1997 Hieda et al. .................. 370/445

(Continued)

FOREIGN PATENT DOCUMENTS

EP 0 607 733 A1 7/1994
FR 2 782 216 2/2000

(Continued)

OTHER PUBLICATIONS

Klein et al, "Isochronous Datagram Delivery Over Contention-Based Data Link", U.S. Appl. No. 60/550,722, filed Mar. 5, 2004. All pages included, the most pertinent pages are pp. 1-4.*

J. H. Gass, et al., "Adaptive Transmission Protocols for Frequency-Hop Radio Networks", Proceedings of the 1998 IEEE Military Communications Conference, vol. 1, Oct. 1998, 5 pages.

(Continued)

*Primary Examiner* — Jung Park
(74) *Attorney, Agent, or Firm* — Oblon, Spivak, McClelland, Maier & Neustadt, L.L.P.

(57) ABSTRACT

Access control based on CSMA is favorably carried out with the RTS/CTS method used together.

If the RTS/CTS procedure is used together, CTS information is transmitted in response to the reception of RTS information, and data is transmitted in response to the reception of CTS. The CTS transmitting station measures the quality of RTS receive signal, and thereby determines a transmission rate at which it can receive and notifies a station as the destination of CTS. The station as the destination of CTS transmits data in response to CTS information. As the transmission rate for this data, the transmission rate indicated in the RATE field in CTS is applied.

16 Claims, 22 Drawing Sheets

(56) References Cited

U.S. PATENT DOCUMENTS

| | | | |
|---|---|---|---|
| 5,721,725 A | 2/1998 | Want et al. | |
| 6,463,044 B1* | 10/2002 | Seo | 370/329 |
| 6,577,613 B1 | 6/2003 | Ramanathan | |
| 6,693,915 B1* | 2/2004 | Lappetelainen et al. | 370/468 |
| 6,721,805 B1* | 4/2004 | Bhagwat et al. | 709/250 |
| 7,164,671 B2* | 1/2007 | del Prado et al. | 370/338 |
| 7,826,539 B2* | 11/2010 | Schneider et al. | 375/259 |
| 2002/0006123 A1* | 1/2002 | Angelico et al. | 370/348 |
| 2002/0059642 A1* | 5/2002 | Russ et al. | 725/135 |
| 2002/0080792 A1 | 6/2002 | Rosier | |
| 2002/0172186 A1 | 11/2002 | Larsson | |
| 2002/0191573 A1 | 12/2002 | Whitehill et al. | |
| 2003/0035434 A1* | 2/2003 | Le et al. | 370/443 |
| 2003/0142667 A1* | 7/2003 | Herring | 370/389 |
| 2003/0166408 A1* | 9/2003 | Zhang et al. | 455/522 |
| 2005/0169232 A1 | 8/2005 | Sakoda et al. | |
| 2005/0195828 A1* | 9/2005 | Klein et al. | 370/395.4 |

FOREIGN PATENT DOCUMENTS

| | | |
|---|---|---|
| JP | 07-046268 | 2/1995 |
| JP | 08-037528 | 2/1996 |
| JP | 11-215161 A | 8/1999 |
| JP | 2000-151639 | 5/2000 |
| JP | 2004-531971 | 10/2004 |
| JP | 2004-533158 | 10/2004 |
| WO | WO 00/52950 | 9/2000 |
| WO | WO 00/56002 | 9/2000 |
| WO | WO 00/60797 | 10/2000 |
| WO | WO 01/37473 A1 | 5/2001 |
| WO | WO 02/103610 A2 | 12/2002 |
| WO | WO 02/103610 A3 | 12/2002 |
| WO | WO 03/069937 A1 | 8/2003 |
| WO | WO 2004/071021 A1 | 8/2004 |

OTHER PUBLICATIONS

Eun-Sun Jung, et al., "A Power Control MAC Protocol for Ad Hoc Networks", Proceedings of the 8th Annual International Conference on Mobile Computing and Networking, Sep. 2002, 12 pages.

Gavin Holland, et al., "A Rate-Adaptive MAC Protocol for Multi-Hop Wireless Networks", Proceedings of the 7th Annual International Conference on Mobile Computing and Networking, Jul. 2001, 15 pages.

Jeffrey P. Monks, et al., "A Power Controlled Multiple Access Protocol for Wireless Packet Networks", Proceedings of the Twentieth Annual Joint Conference of the IEEE Computer Communications Societies, vol. 1, Apr. 2001, 10 pages.

Javier Gomez, et al., "Conserving Transmission Power in Wireless Ad Hoc Networks", Proceedings of the Ninth International Conference on Network Protocols, Nov. 2001, 11 pages.

U.S. Appl. No. 12/717,680, filed Mar. 4, 2010, Sakoda.

U.S. Appl. No. 12/501,252, filed Jul. 10, 2009, Sakoda, et al.

Office Action issued Aug. 31, 2010, in Japan Patent Application No. 2004-300675.

Office Action issued Mar. 8, 2011, in European Patent Application No. 08 172 154.0-2412.

Japanese Office Action issued on Feb. 1, 2011 in corresponding Japanese Application No. 2004-300675.

Nader S. Fahmy et al., "Ad Hoc Networks with Smart Antennas Using IEEE 802.11-Based Protocols", ICC 2002, IEEE International Conference on Communications, May 2, 2002, vol. 5, pp. 3144-3148.

Japanese Office Action issued Jul. 17, 2012 in corresponding Japanese Application No. 2010-240625.

U.S. Appl. No. 13/475,600, filed May 18, 2012, Sakoda.

Japanese Office Action Issued Nov. 6, 2012 in Patent Application No. 2010-240625.

Japanese Office Action issued Jul. 9, 2013 in Japanese Patent Application No. 2012-202886, 5 pages (No English translation).

Communication pursuant to Article 94(3) EPC issued Jan. 13, 2014, in European Patent Application No. 08 172 154.0.

\* cited by examiner

F I G. 1
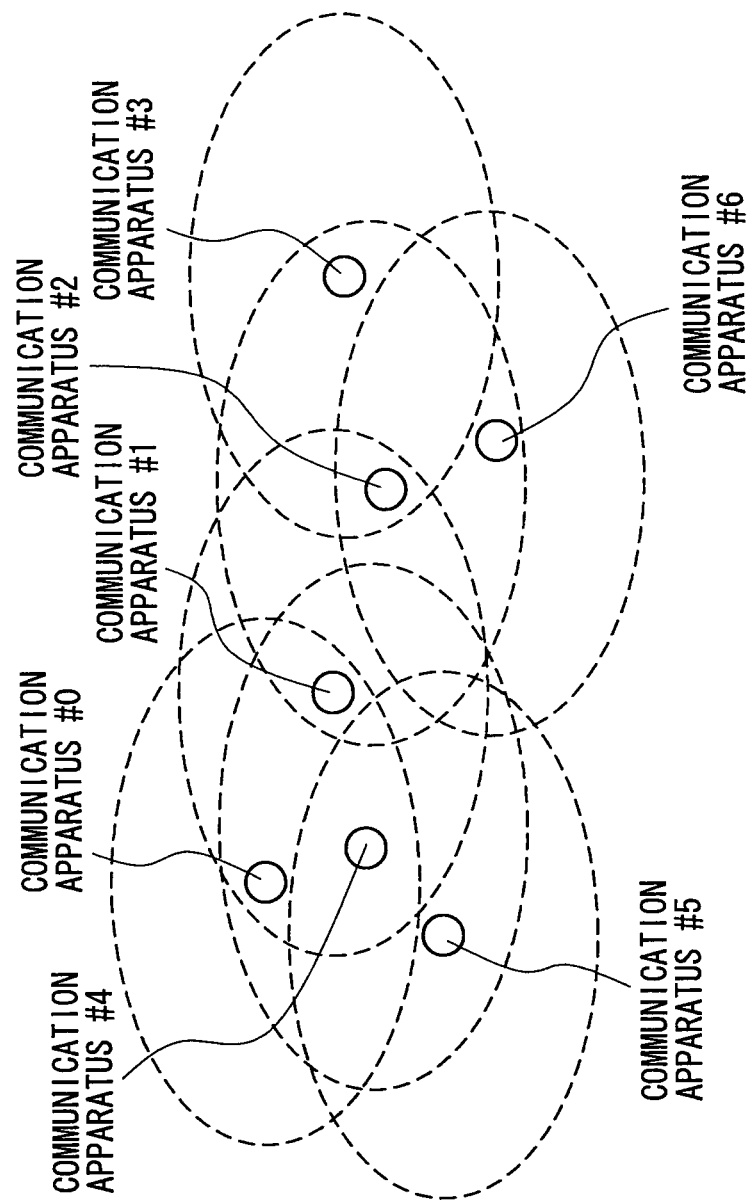

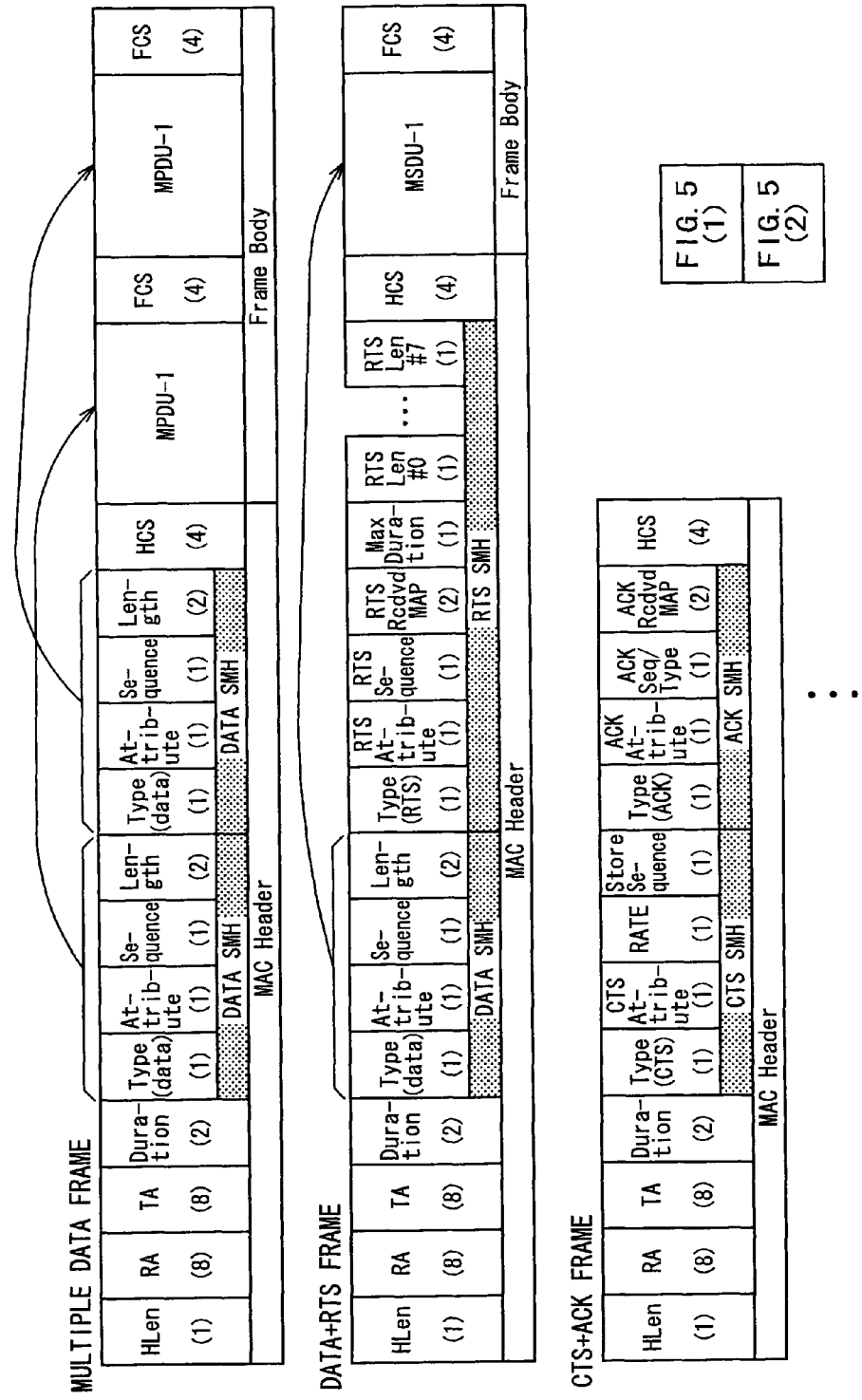
FIG. 5 (1)

FIG. 16

RTS Frame: | Frame Control | Duration | RA | TA | FCS |

CTS/ACK Frame: | Frame Control | Duration | RA | FCS |

Data Frame: | Frame Control | Duration | Addr1 | Addr2 | Addr3 | SEQ | Addr4 | Frame Body | FCS |

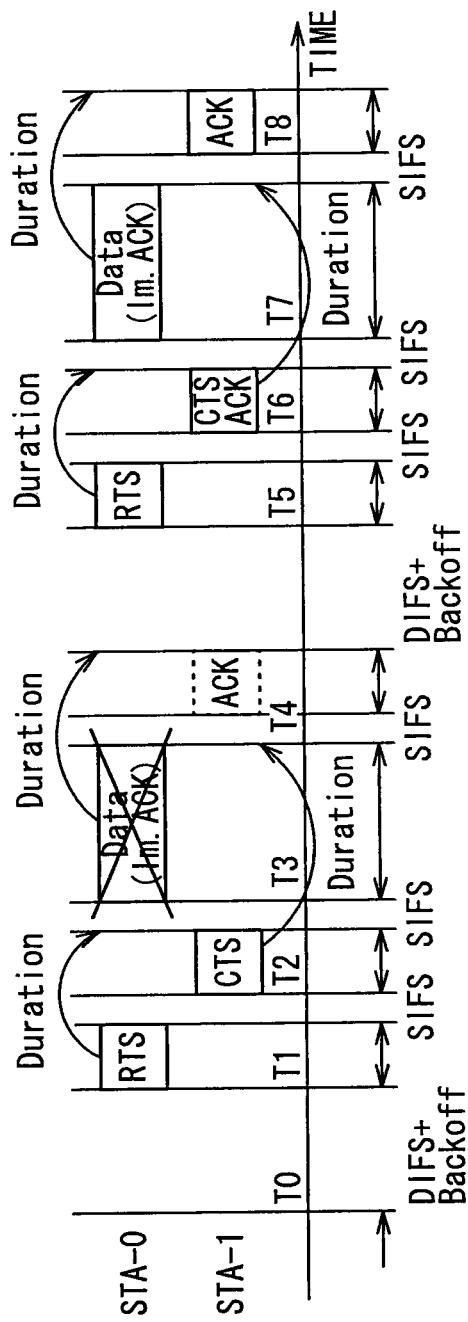

F I G. 2 2
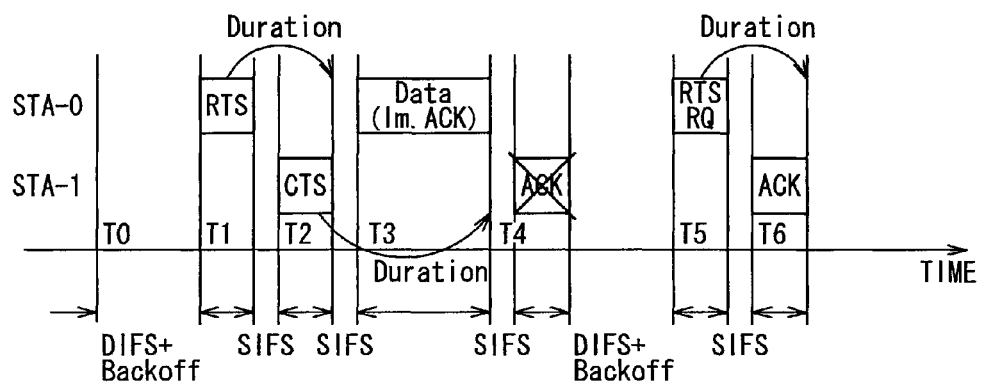
F I G. 2 3
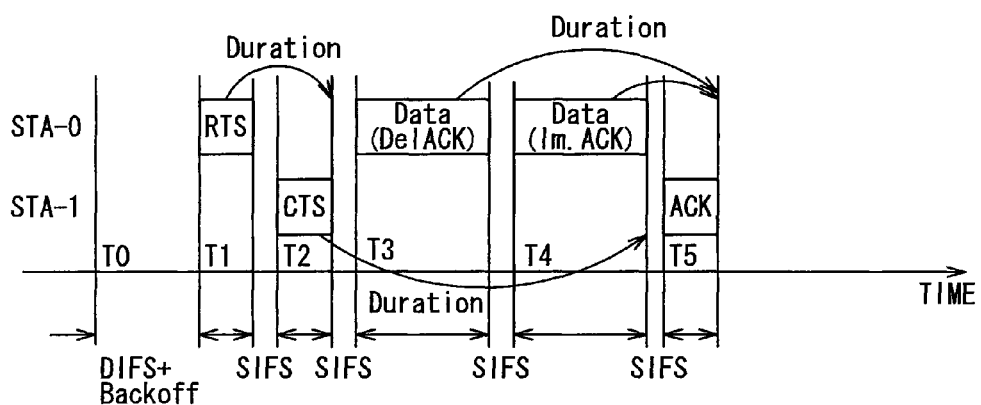

F I G. 2 4
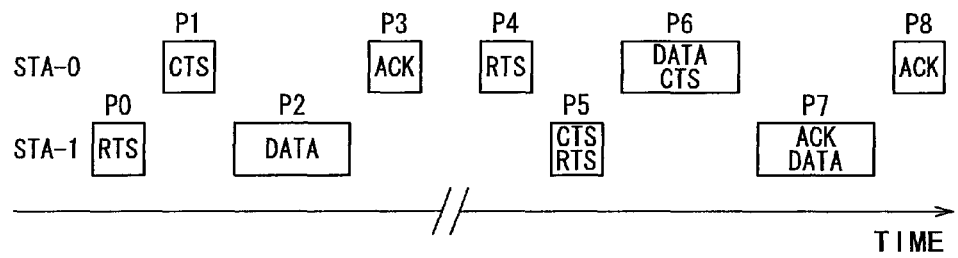
F I G. 2 5
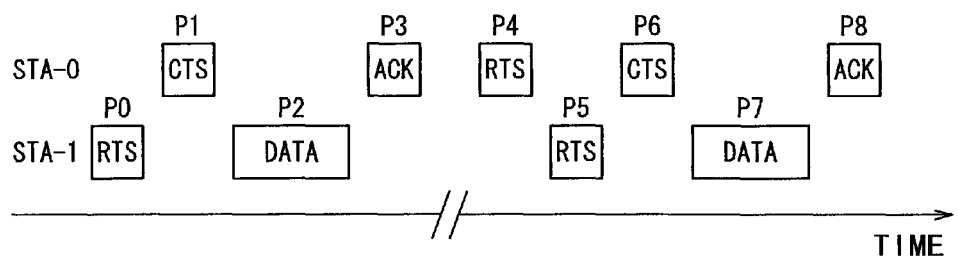
F I G. 2 6
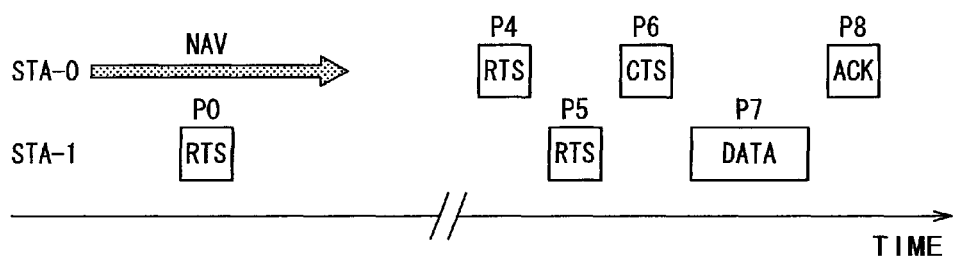

WIRELESS COMMUNICATION SYSTEM, WIRELESS COMMUNICATION DEVICE AND WIRELESS COMMUNICATION METHOD, AND COMPUTER PROGRAM

CROSS REFERENCE TO RELATED APPLICATION

This application is a divisional and claims the benefit of priority under 35 U.S.C. §120 from U.S. application Ser. No. 10/916,596, filed Aug. 12, 2004 and claims the benefit of priority under 35 U.S.C. § 119 of Japanese Patent Application No. 2003-364231, filed Oct. 24, 2003. The entire contents of these applications are incorporated herein by reference.

BACKGROUND OF THE INVENTION

1. Field of the Invention

The present invention relates to a wireless communication system wherein a plurality of wireless stations communicate with one another as in wireless LAN (Local Area Network) or PAN (Personal Area Network), a wireless communication device and a wireless communication method, and a computer program. More particularly, it relates to a wireless communication system, a wireless communication device and a wireless communication method, and a computer program wherein random access is made based on carrier detection by CSMA/CA (Carrier Sense Multiple Access with Collision Avoidance).

Further more particularly, the present invention relates to a wireless communication system, a wireless communication device and a wireless communication method, and a computer program wherein access control is carried out based on CSMA using the RTS/CTS method to maintain communication quality. Further more particularly, it relates to a wireless communication system, a wireless communication device and a wireless communication method, and a computer program wherein a plurality of classes of frames, such as RTS, CTS, DATA, and ACK, are multiplexed and thereby flexible transmitting and receiving procedures are provided and overheads are reduced.

2. Description of the Related Art

The wireless network has received widespread attention as a communication system which relieves users of cable wiring between wire communication devices. With the wireless network, the majority of cables can be omitted in working spaces, such as offices; therefore, communication terminals, such as personal computers (PCs), can be relatively easily relocated. As wireless LAN systems become faster and inexpensive, recently the demand for the wireless network has been significantly increased. In particular, these days, the introduction of personal area network (PAN) has been considered to build a small-scale wireless network among a plurality of pieces of electronic equipment existing in people's surroundings to carry out information communication. For example, different wireless communication systems and wireless communication devices are defined using frequency bands, such as 2.4-GHz band and 5-GHz band, for which licenses from competent authorities are unnecessary.

Typical standards related to wireless network include IEEE (The Institute of Electrical and Electronics Engineers) 802.11 (Refer to Non-Patent Document 1, for example.), Hiper-LAN/2 (Refer to Non-Patent Document 2 or Non-Patent Document 3, for example.), IEEE802.15.3, and Bluetooth communication. With respect to the IEEE802.11 standard, various wireless transmission methods, such as the IEEE802.11a standard and the IEEE802.11b standard, are present depending on differences in wireless communication method and frequency band used.

To build a local area network using radio engineering, the following method is generally used: one device, designated as "access point" or "coordinator," that functions as control station is provided in the area. Then the network is formed under the centralized control of the control station.

In wireless networks provided with an access point, an access control method based on bandwidth reservation is in wide use. In this method, when information is transmitted from some communication device, a band required for the information transmission is reserved at the access point. Thus, transmission channels are utilized so that collision with information transmission by other communication devices will be prevented. That is, by providing an access point, synchronous wireless communication, wherein the communication devices within the wireless network synchronize them with one another, is carried out.

However, a problem arises if asynchronous communication is carried out between a transmitting communication device and a receiving communication devices in a wireless communication system provided with an access point: wireless communication must be carried out through the access point without exception, and thus the efficiency of transmission channel utilization is reduced by half.

To cope with this, "ad-hoc communication" in which terminals asynchronously communicate directly with each other has been devised as another method for building a wireless network. In particular, in small-scale wireless networks consisting of a relatively small number of clients located nearby, the ad-hoc communication is believed to be appropriate. In the ad-hoc communication, any terminals can carry out wireless communication directly, or randomly, with each other without use of any specific access point.

In ad-hoc wireless communication systems, a central control station does not exist; therefore, it is suitable for constituting, for example, a home network comprising household electric appliances. The ad-hoc network has the following features, for example: even if one unit becomes faulty or is turned off, routing is automatically changed, and thus the network is less prone to fail; packets are caused to hop a plurality of times between mobile stations, and thereby data can be transmitted a relatively long way with a high data rate maintained. Various cases of ad-hoc system development have been known. (Refer to Non-Patent Document 5, for example.)

For example, the IEEE802.11 wireless LAN systems are provided with ad-hoc mode in which the system autonomously and decentralizedly operates in a peer to peer manner without providing a control station.

With respect to wireless LAN networks in the ad-hoc environment, it is generally known that a problem of hidden terminal occurs. Hidden terminal is a communication station which can be heard by one communication station as the counterpart of communication but cannot be heard by the other when communication is carried out between the specific communication stations. Hidden terminals cannot carry out negotiation between them, and thus transmit operation can collide.

As one of methodologies for solving such a problem of hidden terminal, CSMA/CA according to the RTS/CTS procedure is known.

The CSMA/CA (Carrier Sense Multiple Access with Collision Avoidance) is a connecting method wherein multiple access is made based on carrier detection. In wireless communication, it is difficult for a communication device to receive signals by which the device itself transmits information. Therefore, the communication device confirms that there is no information transmission from other communication devices by the CSMA/CA (Collision Avoidance) system, not by the CSMA/CD (Collision Detection) system. Then, the communication device starts its own information transmission, and thereby collision is avoided. The CSMA system is an access method suitable for asynchronous data communication, such as file transfer and electronic mail.

In the RTS/CTS method, the communication station as the origin of data transmission transmits a request to send packet RTS (Request To Send). In response to the reception of a response packet CTS (Clear To Send) from the communication station as the destination of data transmission, the transmitting communication station starts data transmission. When hidden terminals receive either or both of RTS and CTS, they set their own transmission stop period. The transmission stop period is equivalent to a period during which data transmission is expected to be performed based on the RTS/CTS procedure. Thus, collision can be avoided. Hidden terminals for the transmitter station receive CTS and set a transmission stop period to avoid collision with data packets. Hidden terminals for the receiver station receive RTS and stop a transmission period to avoid collision with ACK.

Here, the wireless network will be described with IEEE802.11a, an expansion standard to IEEE802.11, taken as an example.

FIG. 15 illustrates the frame format specified by IEEE802.11a. In the figure, a preamble which indicates the presence of packet is added to the head of each packet. For the preamble, known symbol patterns are defined in the standard. Based on these known patterns, receivers can judge whether a receive signal corresponds to a preamble or not.

Following the preamble, SIGNAL field is defined. In the SIGNAL field, information required for decoding the information portion of the packet concerned is placed. The information required for decoding packets is designated as PLCP header (Physical Layer Convergence Protocol header). The PLCP header includes: RATE field which indicates the transmission rate of an information portion (This includes Service field as part of PLCP header; however, it is hereafter simply and generically referred to as "information portion" for the purpose of simplifying the explanation.); LENGTH field which indicates the length of information portion; parity bit; Tail bit of encoder; and the like. Receivers decode the subsequent information portions based on the result of decoding the RATE and LENGTH fields in the PLCP header.

The SIGNAL portion where the PLCP header is placed is subjected to encoding resistant to noise, and is transmitted at 6 Mbps. In case of normal packets, the information portion is transmitted in a transmission rate mode in which the highest bit rate is provided to the extend that the occurrence of errors is minimized according to the SNR or the like of the receiver.

IEEE802.11a defines eight classes of transmission rate modes: 6, 9, 12, 18, 24, 36, and 54 Mbps, and any of them is selected. If a transmitter/receiver is positioned nearby, a high-bit rate transmission rate mode is selected. A communication station positioned far away cannot decode this information sometimes.

The information portion is transferred as PSDU (Physical Layer Service Data Unit) to the data link layer as the higher level layer. FIG. 16 illustrates the constitution of the PSDU frame field. IEEE802.11 defines several frame types. Here, description will be given only to four types of frames, RTS, CTS, ACK, and DATA, required for describing the present invention.

For each frame, Frame Control field and Duration field are defined in common. The Frame Control field holds information indicating the type and use of the frame concerned, and more specifically, it describes the information listed in Table 1. The Duration field holds information on the use of NAV (Network Allocation Vector) (to be described later), and describes the time that elapses before the transaction of the packet concerned is completed.

TABLE 1

| Field Name | Length [Bit] | Description |
|---|---|---|
| Protocol Version | 2 | Version information |
| Type/Subtype | 6 | Identifier indicating the frame type |
| ToDS, FromDS | 2 | Identifier determining what each ADDR indicates |
| More Fragment | 1 | Flag indicating the last fragment |
| Retry | 1 | Flag indicating whether this is retransmission or not |
| Power Management | 1 | Flag indicating power management mode |
| More Data | 1 | Flag indicating whether more data has been accumulated or not |
| WEP | 1 | Flag indicating the utilization of WEP |
| Other | 1 | |

In addition to the foregoing, the Data frame contains: four address fields Addr1 to Addr4 for identifying the communication stations as the origin of transmission and the destination and others; sequence field (SEQ); Frame Body which is the primary information to be provided to the upper level layer; and FCS (Frame Check Sequence) which is a checksum.

In addition to the foregoing, the RTS frame contains: Receiver Address (RA) which indicates the destination; Transmitter Address (TA) which indicates the origin of transmission; and FCS which is a checksum.

In addition to the foregoing, the CTS frame and ACK frame contain RA which indicates the destination and FCS which is a checksum.

Here description will be given to the method for coping with access contention defined in IEEE802.11.

IEEE802.11 defines four types of inter frame spaces (IFS): SIFS (Short IFS), PIFS (PCF IFS), DIFS (DCF IFS), and EIFS (extended IFS) in ascending order.

IEEE802.11 adopts CSMA as a basic media access procedure (described above). Before a transmitter transmits something, the state of the medium is monitored and further a backoff timer is actuated for a random time. The transmitter is provided with transmission right only when there is no a transmit signal during this period, and the transmitter can transmit packets on the medium.

When a normal packet is transmitted according to the CSMA procedure, the DCF (Distributed Coordination Function) operate as follows: after the transmission of a packet of some kind is completed, the state of the medium is monitored only for a DIFS. If there is no transmit signal during this period, random backoff is carried out. If there is no transmit signal during this period, either, then transmission right is provided.

When a packet, such as ACK, whose degree of urgency is exceptionally high is transmitted, it is permitted to transmit the packet after a short inter frame space SIFS. Thus, packets whose degree of urgency is high can be transmitted before packets transmitted according to the normal CSMA procedure.

To sum up, the reason why different types of inter frame spaces IFS are defined is as follows: packets competing for transmission right are given priorities according to whether their IFS is SIFS, PIFS, or DIFS, that is, according to the length of inter frame space.

Next, description will be given to the RTS/CTS procedure in IEEE802.11, referring to FIG. 17 to FIG. 19. With respect to wireless LAN networks in the ad-hoc environment, it is generally known that a problem of hidden terminal occurs. CSMA/CA according to the RTS/CTS procedure is known as one of methodologies for alleviating most of this problem (described above). IEEE802.11 also adopts this methodology.

FIG. 17 schematically illustrates an example of the operation of the RTS/CTS procedure. This figure shows an example in which information (Data) of some kind is transmitted from STA0 to STA1.

Prior to the actual transmission of information, STA0 transmits an RTS (Request To Send) packet to STA1 as the destination of information according to the CSMA procedure. In response to the reception of the RTS packet, STA1 transmits a CTS (Clear To Send) packet to STA0, feeding back that STA1 has successfully received the RTS.

If the transmitting STA0 successfully receives the CTS packet, the medium is considered to be clear, and the transmission of information (Data) packets is immediately started. When STA1 has successfully received the information (Data) packets, STA1 returns an ACK packet. Thus, the transmission and reception transaction equivalent to one packet is completed.

FIG. 18 illustrates action which can take place in surrounding stations when the RTS/CTS procedure is carried out between a transmitter station and a receiver station. In this figure, the following communication environment is assumed: four communication stations, STA2, STA0, STA1, and STA3, exist, and communication stations adjoining to each other in the figure are located within the range of radio waves. Here, it is assumed that STA0 desires to transmit information to STA1.

The transmitting STA0 confirms that the medium is clear for a certain period (from time T0 to time T1) according to the CSMA procedure. Then, STA0 starts the transmission of an RTS packet to STA1 at time T1. In the Type/Subtype field of the Frame Control field of the RTS packet, information which indicates the packet concerned is RTS is described; in the Duration field, the time that lapses before the transmission and reception transaction for the packet concerned is completed (i.e. the time until time T8) is described; in the RA field, the address of the destination communication station (STA1) is described; and in the TA field, the address of the transmitter station (STA0) itself is described.

Here, attention should be paid to the following point: for STA0 to describe in the Duration field the time that lapses before the transaction according to the RTS/CTS procedure is completed, the time when the transaction is completed must be determined when RTS is transmitted. More specific description will be given. The transmitting STA0 must determine all the transmission rate mode, including CTS packet, Data packet, and ACK packet to be subsequently transmitted and received in the transaction in question, when it transmits RTS. The transmission rate mode determined here relates to the entire transaction, and it is not permitted to set an individual transmission rate mode with respect to each packet transmission within a transaction.

FIG. 19 illustrates the procedure according to which the transmitting STA0 determines a transmission rate mode with respect to the entire transaction concerned when it transmits RTS. When RTS is transmitted, it must be determined where the time at which the transaction is completed is (T8 in FIG. 4). Therefore, the transmission rate mode is determined only due to information held by the transmitter station when it transmits RTS (based on the amount of data communicated in the entire transaction, the transmission rate, and the like). The transmission rate of each of the CTS, DATA, and ACK frames thereafter transmitted and received is basically in accordance with the rate applied in the RTS. That is, it is not permitted to set an individual transmission rate mode with respect to each packet transmission within a transaction.

Here, description will be given, referring to FIG. 18 again. The RTS packet is received also by STA2 which is positioned in the vicinity of STA0. When STA2 receives the RTS signal, STA2 discovers the preamble and thus starts receive operation. Further, STA2 decodes PSDU based on the information obtained by decoding the PLCP header. Then, STA2 recognizes from the Frame Control field in the PSDU that the packet in question is RTS packet, and knows that STA0 desires to transmit information of some kind. Further, STA2 recognizes from the RA field that STA2 itself is not the destination communication station. Then, STA2 does not monitor the medium and recognizes that the medium is occupied until the transaction in question is completed, and stops its own transmission so as not to hinder STA0's desire to send. To refer to this operation, it is said that a surrounding station "sets NAV (Network Allocation Vector)." The NAV is effective during the period indicated in the Duration field, and STA2 is kept in transmission prohibited state until time T8.

The RTS packet is received also by STA1 which is the intended destination. STA1 decodes the PSDU according to the same procedure as described above, and thereby recognizes that STA0 desires to transmit packets to STA1 itself. Then, STA1 waits for a SIFS (described above) and returns a CTS packet at time T3.

At this time, the transmission rate mode of the CTS packet must be identical with that of RTS. Further, in the Frame Control field of the PSDU, it is described that the packet concerned is CTS packet; in the Duration field, the time that elapses between the transaction concerned is completed (i.e. time until time T8) is described; and in the RA field, the address of the destination communication station (STA1) is described.

The CTS packet is received also by STA3 which is positioned in the vicinity of STA1 as the destination of transmission. STA1 decodes the PSDU according to the same procedure as described above, and recognizes that "some nearby communication station is expected to receive packets until time T8." STA3 sets an NAV and refrains from its own transmission until the transaction concerned is completed so as not to hinder STA1's desire to receive. The NAV is effective during the period indicated in the Duration field, and STA3 is also kept in transmission prohibited state until time T8.

The CTS packet is received also by STA0 as the destination. STA0 decodes the PSDU according to the same procedure as described above, and recognizes that STA1 has got ready to receive. Then, STA0 waits for a SIFS, and starts the transmission of Data packet at time T5.

If the transmission of the Data packet is completed at time T6 and STA1 decodes them without any error, STA1 waits for a SIFS and returns ACK at time T7. When STA0 receives it, the transmission and reception transaction equivalent to one packet is completed at time T8.

At time T8, STA2 and STA3 which are nearby communication stations put down the NAV, and return to ordinary transmitting and receiving state.

In summary, in the above-mentioned RTS/CTS procedure, the following surrounding stations are prohibited from carrying out transmission: a "surrounding station for STA0 as the transmitter station," or STA2, which could receive RTS, and a "surrounding station for STA1 as the receiver station," or STA3, which could receive CTS. Thus, information transmission from STA0 to STA1 and a return of ACK are carried out without being hindered by a sudden transmit signal from surrounding stations. Therefore, the communication quality is maintained.

FIG. 20 illustrates an example of an operation sequence followed when the above-mentioned packet transmission and reception transaction based on the RTS/CTS procedure in IEEE802.11 is implemented with traffic through TCP/IP (Transmission Control Protocol/Internet Protocol). The TCP/IP is a typical communication protocol for transmission control and path control.

Even if communication is of one way in terms of application, ACK is returned by the TCP layer typically every two segments, and it is brought into the form of asymmetrical two-way communication in the MAC layer. The ACK of the TCP layer is small in amount of data, and thus RTS/CTS is not used together. However, RTS/CTS is used together with respect to data traffic. The figure illustrates such an example.

In the example illustrated in FIG. 20, packets equivalent to 24 times in total are transmitted and received in the MAC layer to transmit five segments, Data0 to Data4. That is, while the operation in the TCP layer is relatively simple, complicated operation is performed in the MAC layer.

As described up to this point, problems of access contention and bandwidth assurance can be solved by implementing the transmitting and receiving procedures based on CSMA in combination with the RTS/CTS method in accordance with IEEE802.11. Meanwhile, several problems described below are left unsolved.

(1) Imperfection of Transmission Rate

When data is transmitted and received according to the RTS/CTS procedure, the transmission rate of data packets must be determined before an RTS packet is transmitted.

This is because, for a transmitter station to describe in the Duration field the time that lapses before a transaction based on the RTS/CTS procedure is completed, the time at which the transaction is completed must be determined when it transmits an RTS. This means that all the transmission rate mode, including CTS packet, Data packet, and ACK packet subsequently transmitted and received in that transaction must be determined when RTS is transmitted. The transmission rate mode determined when RTS is transmitted relates to the entire transaction; it is not permitted to set an individual transmission rate mode with respect to each packet transmission within a transaction. Therefore, the transmission rate is imperfect.

Further, transmitter stations cannot grasp the state of reception in receiver stations in real time. Therefore, determining the transmission rate of the entire transaction when RTS is transmitted results in a lower probability that data packets are transmitted at the optimal transmission rate corresponding to the state of reception in the receiver station.

An example will be taken. Patent Document 1 discloses a method for packet transfer communication. The method is such that, when the receiving end receives an RTS packet, it measures the environment and state of communication at that point of time; then, the receiving end adds the result of the measurement to the CTS packet and returns it to the transmitting end; thereby the transmitting end optimizes the communication rate and the like. However, this case is also nothing but another case where the transmitting end determines the transmission rate of the entire transaction before it transmits an RTS packet. Therefore, the imperfection of transmission rate is not eliminated.

The RTS transmitter station is required to: determine the transmission rate of the entire transaction including CTS packet, Data packet, and ACK packet transmitted and received as the outcome of RTS transmission; determine a value to be written as the transaction finish time, that is, Duration based on a value obtained by dividing the amount of transmitted data by the transmission rate; and describe the determined value in RTS. Patent Document 1 describes that the CTS transmitter station determines a transmission rate through the reception of RTS; however it does not refer to how to obtain the value in the Duration field described in RTS by the RTS transmitter station prior thereto.

If the CTS transmitting station sets a high transmission rate, the transaction is completed ahead of the Duration determined when RTS is transmitted. As a result, the surrounding stations which heard the RTS still keep a NAV set and refrain from their own transmission after the transaction is completed, and this is a waste of bandwidth. If the CTS transmitting station sets a low transmission rate, the transaction is not completed even after the Duration determined when RTS is transmitted has passed. Nevertheless, surrounding stations which heard RTS put down the NAV and start transmit operation, and this induces collision.

(2) Difficulty of Data Unit Multiplexing with RTS/CTS Used Together

In the conventionally known RTS/CTS procedure, the data transmitting end determines a data rate before it transmits an RTS. It does not give consideration to the following: the data receiving end determines a data rate and further transmits a plurality of data units as one data packet. To enhance the efficiency of the MAC layer (Refer to FIG. 20.), it is preferably that the receiving end should be capable of determining a data rate and transmitting a plurality of data units as one data packet. However, the conventional RTS/CTS format cannot implement this.

(3) Concomitant Use of Delay Acknowledgement and RTS/CTS Procedure

The IEEE802.11 standard is premised on the immediate ACK wherein an acknowledgement (ACK) is returned as soon as data is received. To reduce the overhead of ACK packets, delay ACK can be used.

However, some problems arise. For example, if delay ACK is used together with the RTS/CTS procedure, there is a possibility that an RTS is transmitted for the purpose of retransmission before an ACK cannot be returned to the transmitting end. Thus, with the existing format, the concomitant use of delay acknowledgement and the RTS/CTS procedure has its limit in the enhancement of efficiency.

(4) Methodology For Selective Acknowledgement

It is known that carrying out selective acknowledgement enhances the efficiency of the MAC layer. The IEEE802.11 standard does not give consideration to selective acknowledgement itself. The selective acknowledgement referred to here is a retransmission control method. In this method, ACK or NACK information is fed back to the transmitting end with respect to an arbitrary packet which was or was not successfully received. Thereby, retransmission is carried out only with respect to packets which the receiving end could not receive.

Implementation of selective acknowledgement requires massive memory and its processing places a significant burden; therefore, it has not be actually applied so much. However, necessity for selective acknowledgement will be more and more increased in the future. With this being the situation, the following case is expected: communication stations in the initial stage do not have selective acknowledgement implemented but communication stations developed later have selective acknowledgement implemented. In this case, it is unfavorable that both cannot communicate with each other, and a format wherein downward compatibility is maintained is desired.

Further, up to now consideration has not given to concomitant use of selective acknowledgement, a technique for the receiving end to determine a data rate, and the RTS/CTS procedure. Therefore, this cannot be implemented by the existing format.

(5) Influence of Overhead Produced in MAC Layer

The IEEE802.11 standards independently defines RTS frame, CTS frame, ACK frame, and the like. (Refer to FIG. 16.) For this reason, if individual information is to be transmitted, they must be respectively transmitted by separate frames.

However, each time a frame is transmitted, overheads, such as preamble, are produced. In particular, if the transmission rate is high, the amount of overheads becomes too large to neglect.

Needless to add, increase in overheads in the MAC layer is undesirable because it contributes in such a direction as to limit the bandwidth which can be provided for the upper level layers, such as TCP/IP.

[Patent Document 1] Japanese Unexamined Patent Publication No. 2000-151639

[Non-Patent Document 1] International Standard ISO/IEC 8802-11: 1999(E) ANSI/IEEE Std 802.11, 1999 Edition, Part11: Wireless LAN Medium Access Control (MAC) and Physical Layer (PHY) Specifications

[Non-Patent Document 2] ETSI Standard ETSI TS 101 761-1 V1.3.1 Broadband Radio Access Networks (BRAN); HIPERLAN Type 2; Data Link Control (DLC) Layer; Part1: Basic Data Transport Functions

[Non-Patent Document 3] ETSI TS 101 761-2 V1.3.1 Broadband Radio Access Networks (BRAN); HIPERLAN Type 2; Data Link Control (DLC) Layer; Part2: Radio Link Control (RLC) sublayer

[Non-Patent Document4] C. K. Tho, "Ad Hoc Mobile Wireless Network" (Prentice Hall PTR)

SUMMARY OF THE INVENTION

An object of the present invention is to provide an excellent wireless communication system, wireless communication device and wireless communication method, and computer program wherein the RTS/CTS method is used together and yet access control based on CSMA can be favorably carried out.

Another object of the present invention to provide an excellent wireless communication system, wireless communication device and wireless communication method, and computer program wherein a plurality of types of frames, such as RTS, CTS, DATA, and ACK, are multiplexed and thereby flexile transmitting and receiving procedures can be provided and overheads can be reduced.

The present invention has been made with the above problems taken into account. A first aspect of the present invention is a wireless communication system wherein random access is carried out using together the RTS/CTS method in which a communication station as the origin of data transmission transmits a request to send packet RTS, and starts data transmission in response to the reception of a response packet CTS from a communication station as the destination of data transmission.

The RTS receiving communication station measures the quality of a receive signal, determines a data rate based on the result of the measurement, describes the data rate in CTS, and transmits the CTS.

The CTS receiving communication station carries out data transmission as the outcome of the reception of the CTS information based on the data rate described in the CTS.

The "system" described here refers to what is obtained by logically aggregating a plurality of devices (or functional modules which implement specific functions). It does not matter whether the devices or functional modules are placed in a single enclosure or not.

The RTS transmitting communication station describes in RTS the time that lapses before the reception of a packet, including CTS information, transmitted as the outcome of the reception of RTS information is completed, as medium reservation time information Duration. The CTS transmitting communication station describes in CTS the time that lapses before the reception of a data packet transmitted as the outcome of the reception of CTS information is completed, as medium reservation time information Duration. Other communication stations that receive RTS or CTS set a NAV (Network Allocation Vector), and keep it in effect for the medium reservation time information Duration and bring themselves in transmission prohibited state.

In a wireless communication system according to the first aspect of the present invention, a transmission rate can be selected based on the quality of receive signal. Therefore, the imperfection of transmission rate can be wiped off.

Here, the following constitution may be adopted: the RTS sending communication station describes in RTS factor information referred to by the RTS receiving communication station when it determines a data rate. The RTS receiving communication station determines a data rate with consideration given to the factor information described in the RTS, in addition to the result of measurement of the quality of receive signal.

As the factor information described here, information related to whether a high data rate should be aggressively determined or a low data rate should be passively determined is described. Further, the following constitution may be adopted: the RTS transmitting communication station measures the transmission error rate for the RTS receiving communication station. Then, based on the result of the measurement, factor information (Rate Strategy) is determined. Or, factor information may be determined based on the difference in transmission power between RTS packet and data packet, the causal relationship between data rate and transmission power, or the like.

In these cases, a data rate is determined according to the quality of RTS receive signal at the receiving end. A transmission rate is determined with consideration additionally given to information, such as error rate monitored by the transmitting end. Therefore, the correspondence between reception quality and error rate arising from fluctuation in channel state or fluctuation in the amount of interference can be corrected in two steps.

Further, the following constitution may be adopted: the RTS transmitting communication station describes in RTS information related to one or more data units the station tries to transmit. The RTS receiving communication station determines medium reservation time information Duration in which the reception of all the data packets is completed. The medium reservation time information Duration is determined based on the information related to the data units, described in the RTS and the determined data rate. Then, the station describes it in CTS. In this case the data transmitting communication station which receives the CTS carries out data transmission as the outcome of the reception of CTS information. The data transmission is carried out based on the data rate described in the CTS so that the data transmission will be completed in a time specified by the medium reservation time information.

Examples of the information related to data units, referred to here, include: the data length of each data unit for which transmission is tried; the sum of data lengths of one or more data units for which transmission is tried; the length of time required for transmitting one or more data units for which transmission is tried; information on the number of data units for which transmission is tried (in this case, however, data units are of fixed length); and the like.

In these cases, the RTS/CTS procedure can be used together and further data units can be effectively multiplexed. Further, the RTS/CTS procedure and delay ACK can be implemented. As a result, the amount of overheads produced in the MAC layer can be reduced.

In this case, when the RTS receiving communication station determines medium reservation time information after the reception of RTS, the station takes into account the time at which the station itself completes data reception. Or, when the RTS receiving communication station determines medium reservation time information after the reception of RTS, it gives consideration so that the period information described in the RTS is not exceeded.

For example, the following constitution may be adopted: the RTS transmitting communication station assigns sequence numbers to transmit data units, and describes in RTS the first sequence number of data the station tries to transmit. Thereby, the station notifies of information related to the data units it tries to transmit. Meanwhile, the RTS receiving communication station refers to the first sequence number of data unit, described in the RTS, and extracts and excludes data units the station has already received from data units for which transmission is tried. Then, the station determines medium reservation time information.

Further, if selective acknowledgement is applied, the following constitution may be adopted: the RTS transmitting communication station describes reception acknowledgement information in RTS. The reception acknowledgement information includes the first sequence number of data units for which data transmission is tried and bit map information obtained by mapping the reception confirmation information on the subsequent data units into bits corresponding to the relative positions to the first sequence number. Further, the station generates information related to the data units with only data units for which reception confirmation has not been obtained taken as objects to be transmitted. Meanwhile, the RTS receiving communication station refers to the bit map information described in the RTS. The station extracts data units the station has already received from data units for which transmission is tried, and excludes them from the objects to be transmitted. Then, the station determines medium reservation time information.

Further, the following constitution may be adopted: if data units the RTS receiving communication station has already received are included in data units as objects to be transmitted, described in RTS, the station describes ACK information in CTS. In this case, the CTS receiving communication station excludes data units the RTS receiving communication station has already received from objects to be transmitted based on the ACK information added to the CTS. Then, the station carries out data transmission based on the data rate described in the CTS.

Further, the following constitution may be adopted: the RTS receiving communication station stores one or more pieces of data length information of data units taken as objects to be transmitted, of data for which transmission is tried as the outcome of the RTS. Then, the station describes in CTS the sequence number of the last data unit stored. In this case, the CTS receiving communication station stores the sequence number of the last data unit described in the CTS. When an RTS is transmitted next time, the station generates information related to data units for which transmission is tried in such form that the data unit indicated by the sequence number of the last data unit is not included in objects to be transmitted.

A second aspect of the present invention is a wireless communication system wherein a plurality of data units are transmitted and received. Sequence numbers are assigned to transmit data units to identify the data units. At the same time, if selective acknowledgement is applied, the following is caused to take place:

The receiving communication station describes the following in reception acknowledgement information ACK: the sequence numbers of data units completely received in the order of sequence number and the bit map information represented by mapping the state of reception of data of the subsequent sequence numbers into relative bit positions from the sequence numbers. The station transmits the reception acknowledgement information ACK.

The transmitting and receiving communication stations add information indicating a causal data flow to transmit data and acknowledgement.

In a wireless communication system according to the second aspect of the present invention, information required for selective acknowledgement is managed on a data flow-by-data flow basis. Such information includes the sequence numbers of completely received data units, bit map information wherein the state of reception of the subsequent data units are described, and the like. Thus, a plurality of service classes can be handled by different sequence numbers. Therefore, communication can be maintained regardless of whether selective acknowledgement is implemented or not.

Some receiver stations do not support selective acknowledgement. Such receiver stations transmit the bit map information with zero set for all the bits of the bit map field. Thus, the receiver stations can ensure communication with transmitter stations which support the selective acknowledgement function.

Further, some transmitter stations do not support selective acknowledgement. Such transmitter stations disregards the bit map information transmitted from the receiving end, and transmits the bit map information to be transmitted with zero set for all the bits of the bit map field. Thus, the transmitter stations can ensure communication with receiver stations which support the selective acknowledgement function.

Further, with respect to at least one data flow, the ARQ system wherein sequence numbers are not assigned is adopted. When Link session is established, data is transmitted and received through the data flow, and thereby the sequence numbers of the transmitter station and the receiver station are synchronized with each other.

A third aspect of the present invention is a wireless communication system wherein random access is carried out using the RTS/CTS method together. The RTS/CTS method is such that: the communication station as the origin of data transmission transmits a request to send packet RTS. In response to the reception of a response packet CTS from the communication station as the destination of data transmission, the communication station as the origin of data transmission starts data transmission.

The transmission and reception of packets wherein any two or more of request to send RTS, confirmative advice CTS, data, and acknowledgement ACK are multiplexed are permitted.

The amount of overheads produced in the MAC layer can be significantly reduced by including pieces of information, such as RTS, CTS, DATA, and ACK, having different purposes in one packet.

In this case, the communication station which receives a packet containing RTS information transmits a packet containing CTS information according to the contents of the RTS. The communication station which receives a packet containing CTS information transmits a packet containing data according to the contents of the CTS.

Here, the following constitution may be adopted: the RTS transmitting communication station can specify whether the receiving communication station may add RTS information to CTS or not. In this case, in RTS, first information which indicates whether RTS information may be added to CTS transmitted as the outcome of the RTS or not is described. Then, the RTS receiving communication station judges whether it may add RTS information to CTS based on the first information in the RTS. If there is data the station desires to transmit to the RTS transmitting communication station, it adds RTS information for the purpose of transmitting the data to CTS, and transmits the CTS.

In this case, the RTS transmitting communication station determines the first information, for example, based on information elements contained in the packets received in the past from the station to which the RTS is directed. The information element described here refers to More bit which indicates the presence of subsequent transmit data in the packet, and the like. Alternatively, it may be judged from other means than information elements that subsequent transmit data is present in the station to which the RTS is directed to determine the first information. Examples include the following case: a station receives an RTS from a station to which RTS is directed. However, the receiving station itself received a packet from another surrounding station and thus has set a NAV. Therefore, the station cannot return a CTS, and the data transmission sequence is stopped. There are also cases where it can be judged based on any other communication history that subsequent transmit data is present in the station to which RTS is directed.

Further, the following constitution may be adopted: the RTS receiving communication station recognizes from the information in the RTS that the RTS transmitting communication station is trying to transmit data the receiving communication station itself has already received. In this case, the RTS receiving communication station adds ACK information to CTS to notify of the state of data reception.

Further, the following constitution may be adopted: in the data transmitting and receiving procedure, the data transmitting communication station specifies whether the data receiving communication station should return an ACK. The ACK includes immediate ACK and delay ACK. In this case, the following constitution may be adopted: the data receiving communication station receives data requesting ACK, from the data transmitting communication station. If the data receiving communication station judges that it has not transmitted an ACK of the data, it adds ACK information when it transmits a packet of some kind to the data transmitting communication station. In some cases, ACK information may be added at the transmitter station's request. At this time, if the transmitter station judges that it has not received ACK information related to previously transmitted data, it sends a request to add ACK information. However, with respect to packets in which RTS information is solely transmitted, ACK information need not be added by way of exception.

Further, data requesting an ACK may be transmitted as a packet directed to two or more communication stations.

Further, the following constitution may be adopted: the RTS transmitting communication station requests the RTS receiving communication station to return an ACK of data which has been transmitted so far. In this case, the RTS transmitting communication station multiplexes an ACK request for requesting a return of ACK into an RTS for starting the next data transmission transaction, and transmits it.

Even if the RTS transmitting communication station requests an ACK, the ACK is not returned sometimes. Possible causes include that transmit data was not properly received, that data was property received but the reception of ACK failed, and the like. In these cases, the RTS transmitting communication station must verify whether to retransmit data. In these cases, the RTS transmitting communication station may multiplex an ACK request requesting a return of ACK into an RTS for starting data retransmission transaction, and transmit it.

The communication station which received an RTS with an ACK request multiplexed returns an ACK which indicates whether it has properly completed the reception of data transmitted from the RTS transmitting communication station. If the station has failed to receive data transmitted from the RTS transmitting communication station, it may multiplex an ACK indicating that it failed to properly receive the data. Then, it may return a CTS requesting to retransmit the data.

A fourth aspect of the present invention is a wireless communication system wherein the data transmitting communication station acquires transmission right on the medium and carries out data communication between it and the data receiving communication station.

After data transmission from the data transmitting communication station is stopped, the presence or absence of subsequent data at the data transmitting communication station is detected. If the subsequent data is present, it is made easier for the data transmitting communication station to acquire transmission right for transmitting the subsequent data.

The state in which, though the subsequent data is present at the data transmitting communication station, data transmission is stopped corresponds to the following cases, for example: cases where an RTS from the data transmitting communication station reaches the data receiving communication station and the data receiving communication station returns a CTS, but the data transmitting communication station does not start data transmission; and cases where transmit data does not reach the data receiving communication station.

The data receiving communication station can detect the presence/absence of the subsequent data at the data transmitting communication station based on the communication history of transactions based on RTS/CTS. Or, the data transmitting communication station can include in a packet a specific information element indicating the presence/absence of the subsequent data and transmit the packet. In this case, the data receiving communication station checks the information element, and can thereby detect the presence/absence of the subsequent data at the data transmitting communication station.

According to CSMA, it is confirmed only for a predetermined period that the medium is clear, and then the operation waits only for an arbitrary backoff time before transmission right is acquired. In the communication environment wherein medium access control is carried out based on CSMA, the data receiving communication station tries to acquire transmission right on the medium, and transmits a signal onto the medium for eliminating other communication stations' transmission right. Thereby, it can be made easier for the data transmitting communication station to acquire transmission right for transmitting the subsequent data.

In medium access control with the RTS/CTS method used together, the communication station as the origin of data transmission transmits a request to send packet RTS. In response to the reception of a response packet CTS from the communication station as the destination of data transmission, it starts data transmission. In case this medium access control is carried out, the data receiving communication station transmits a dummy RTS onto the medium for eliminating other communication stations' transmission right. Thereby, it can be made easier for the data transmitting communication station to transmit an RTS for transmitting the subsequent data. For example, when the data transmitting communication station receives a dummy RTS, it can transmit an RTS with a shorter frame space for transmitting the subsequent data.

A fifth aspect of the present invention is a computer program written in a computer-readable format for performing on a computer system processing for controlling communicating operation in the communication environment wherein random access is carried out with the RTS/CTS method used together. In the RTS/CTS method, the communication station as the origin of data transmission transmits a request to send packet RTS; in response to the reception of a response packet CTS from the communication station as the destination of data transmission, it starts data transmission. The program comprises:

a communication quality measuring step in which, when an RTS is received, the quality of receive signal is measured;

a data rate determining step in which a data rate is determined based on the measured quality of receive signal;

a CTS transmitting step in which the data rate is described in CTS as the outcome of the received RTS, and the CTS is transmitted; and a data transmitting step in which, when CTS information is received, data transmission as the outcome of the CTS information is carried out based on the data rate described in the CTS.

A sixth aspect of the present invention is a computer program written in a computer-readable format for carrying out on a computer system control of communicating operation for transmitting and receiving a plurality of data units. Sequence numbers are assigned to transmit data units to identify the data units. If selective acknowledgement is applied, the following steps are provided:

a step in which, in response to data reception, the sequence numbers of completely received data units in the order of sequence number, and bit map information represented by mapping the state of reception of data of the subsequent sequence numbers into relative bit positions from the sequence numbers, are described in reception acknowledgement information ACK and are transmitted; and a step in which information indicating a causal data flow is added, and transmit data and an acknowledgement are transmitted.

A seventh aspect of the present invention is a computer program written in a computer-readable format for performing on a computer system processing for controlling communicating operation in the communication environment wherein random access is carried out with the RTS/CTS method used together. In the RTS/CTS method, the communication station as the origin of data transmission transmits a request to send packet RTS; in response to the reception of a response packet CTS from the communication station as the destination of data transmission, it starts data transmission. The program comprises:

an information generating step in which varied information, including request to send RTS, confirmative advice CTS, data, and acknowledgement ACK, is generated; and a packet transfer communication step in which a packet wherein any two or more pieces of information of request to send RTS, confirmative advice CTS, data, and acknowledgement ACK are multiplexed is transmitted and received.

An eighth aspect of the present invention is a computer program written in a computer-readable format for performing on a computer system processing for controlling the communicating operation in the following communication environment: in the communication environment, the communication station acquires transmission right on the medium before it carries out data communication. The program comprises:

a step in which the presence/absence of transmit data from other communication stations is detected; and a medium access control step in which, in response to the detection of the presence of transmit data from other communication stations, a signal for eliminating the other communication stations' transmission right is transmitted onto the medium so as to make easier for the relevant communication station to acquire transmission right for transmitting data.

The computer programs according to the fifth to eighth aspects of the present invention are computer programs written in a computer-readable format for performing predetermined processing on a computer system by definition. In other words, when installed on a computer system, the computer programs according to the fifth to eighth aspects of the present invention deliver synergistic action on the computer system and operate as wireless communication devices. When a plurality of such wireless communication devices are started to build a wireless network, the same action and effect as with the wireless communication systems according to the first to fourth aspects of the present invention can be obtained.

According to the present invention, an excellent wireless communication system, wireless communication device and wireless communication method, and computer program wherein the RTS/CTS method is used together and further access control can be favorably carried out based on CSMA can be provided.

Further, according to the present invention, an excellent wireless communication system, wireless communication device and wireless communication method, and computer program wherein a plurality of types of frames, such as RTS, CTS, DATA, and ACK, are multiplexed, and thereby flexible transmitting and receiving procedures can be provided and overheads can be reduced can be provided.

According to the present invention, a transmission rate can be selected based on the quality of receive signals. Therefore, the imperfection of transmission rate can be eliminated. In addition, when a transmission rate is determined, information, such as the error rate monitored by the transmitting end, is also taken into account. Therefore, the correspondence between reception quality and error rate arising from fluctuation in channel state or fluctuation in the amount of interference can be corrected in two steps.

Further, according to the present invention, data units can be effectively multiplexed while the RTS/CTS procedure is used together. Further, the RTS/CTS procedure and delay ACK can be implemented. As a result, the amount of overheads produced in the MAC layer can be reduced.

Further, according to the present invention, communication can be maintained regardless of whether selective acknowledgement is implemented or not.

Further, according to the present invention, the amount of overheads produced in the MAC layer can be significantly reduced by including pieces of information, such as RTS, CTS, DATA, and ACK, having different purposes in one packet.

Other objects, features, and advantages of the present invention will be apparent from the embodiments of the present invention described later and the more detailed description taken in connection with the accompanying drawings.

BRIEF DESCRIPTION OF THE DRAWINGS

FIG. 1 is a drawing illustrating an example of the disposition of communication devices constituting a wireless communication system in an embodiment of the present invention.

FIG. 15 is a drawing illustrating the frame format according to IEEE802.11a.

FIG. 16 is a drawing illustrating the constitution of frame fields in PSDU.

FIG. 21 is a drawing explaining an example of the application of transmitting and receiving procedures according to the present invention.

FIG. 22 is a drawing explaining another example of the application of transmitting and receiving procedures according to the present invention.

FIG. 23 is a drawing explaining a further example of transmitting and receiving procedures according to the present invention.

FIG. 24 is a drawing explaining the mechanism for controlling the judgment of whether "information indicating that an RTS may be multiplexed into a CTS" should be set or not.

FIG. 25 is another drawing explaining the mechanism for controlling the judgment of whether "information indicating that an RTS may be multiplexed into a CTS" should be set or not.

FIG. 26 is a further drawing explaining the mechanism for controlling the judgment of whether "information indicating that an RTS may be multiplexed into a CTS" should be set or not.

DETAILED DESCRIPTION OF THE PREFERRED EMBODIMENTS

Figure 2:
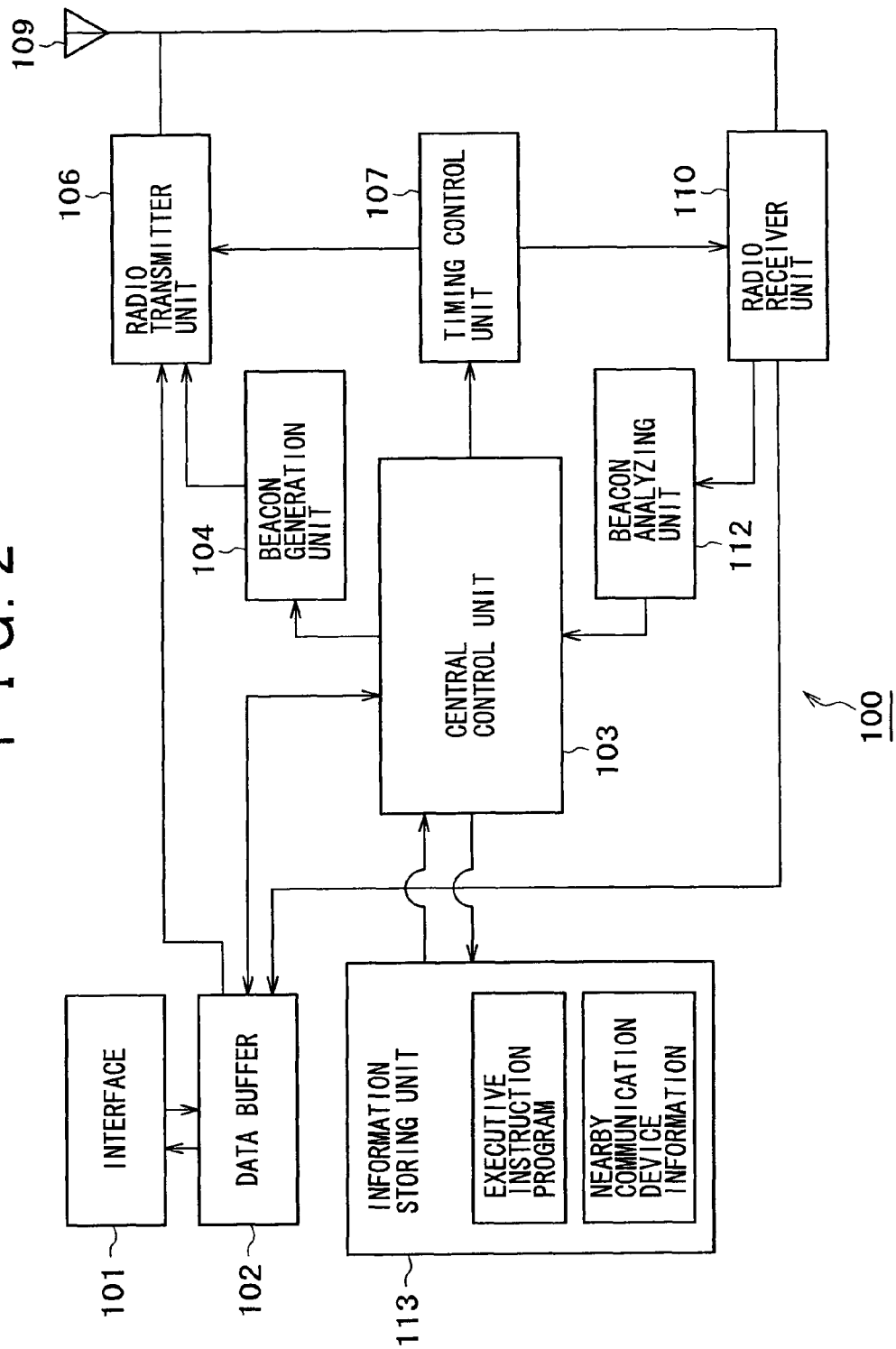
FIG. 2 is a drawing schematically illustrating the functional constitution of a wireless communication device which operates as a communication station in a wireless network in an embodiment of the present invention.

Referring to the drawings, the embodiments of the present invention will be described in detail below.

A. System Configuration

The propagation path for communication the present invention assumes is wireless, and a network is built among a plurality of communication stations. The communication the present invention assumes is store and forward traffic, in which information is transferred on a packet-by-packet basis. With respect to each communication station, the following description assumes single-channel station; however, the present invention can be expanded to cases where a transmission medium comprising a plurality of frequency channels, that is, multiple channels is used.

In a wireless network according to the present invention, each communication station can directly (randomly) transmit information in accordance with an access procedure based on CSMA (Carrier Sense Multiple Access). Thus, the communication stations can build an autonomous and decentralized wireless network.

The autonomous and decentralized wireless communication system does not have the relation of control station and controlled station. In such a wireless communication system, for example, each communication station sends beacon information. The station thereby informs other communication station located nearby (i.e. within the range of communication) of the presence of itself, and informs them of the constitution of the network. A communication station which newly emerges in some communication station's range of communication receives a beacon signal, and thereby detects that it has entered the range of communication. Further, the station decodes the information described in the beacon, and can thereby recognize the network and participate in the network.

In the wireless network according to the present invention, communication stations exchange beacon signals, and modestly and temporally synchronize with each other. Thus, transmission control is carried out wherein channel resources are effectively utilized by transmission (MAC) frames having the time division multiple access structure. Therefore, each communication station can implement an access method based on temporal synchronization, such as reserving a bandwidth and setting a preferential period of use.

The processing at each communication station, described below, is basically carried out at every communication station that participates in the network. In some cases, however, the processing described below is not necessarily performed by all the communication stations constituting the network.

FIG. 1 illustrates an example of the disposition of communication devices which constitute the wireless communication system in an embodiment of the present invention. This wireless communication system does not have the relation of control station and controlled station. In this communication system, each communication device autonomously and decentralizedly operates, and an ad-hoc network is formed. The figure shows how the communication device #0 to the communication device #6 are distributed in the same space.

In the figure, each communication device's range of communication is indicated by broken line. Each communication device can communicate with other communication devices located within its range, and the range of communication is defined as a range in which a signal transmitted by each station interferes with other communication devices. More specific description will be given. The communication device #0 is located in a range in which it can communicate with the communication devices #1 and #4 located nearby; the communication device #1 is located in a range in which it can communicate with the communication devices #0, #2, and #4 located nearby; the communication device #2 is located in a range in which it can communicate with the communication devices #1, #3, and #6 located nearby; the communication device #3 is located in a range in which it can communicate with the communication device #2 located nearby; the communication device #4 is located in a range in which it can communicate with the communication devices #0, #1, and #5 located nearby; the communication device #5 is located in a range in which it can communicate with the communication device #4 located nearby; and the communication device #6 is located in a range in which it can communicate with the communication device #2 located nearby.

When communication is carried out between certain communication devices, a "hidden terminal" exists. Hidden terminal is defined as a communication device which can be heard by either of the communication devices communicating with each other but cannot by the other.

The scope of the present invention is not limited to the above ad-hoc environment. It can be widely applied to other modes of communication wherein each communication station can directly and asynchronously transmit information in accordance with the access procedure based on CSMA with the RTS/CTS procedure used together.

FIG. 2 schematically illustrates the functional constitution of a wireless communication device which operates as a communication station in a wireless network in an embodiment of the present invention. The wireless communication device in the figure can carry out access control based on CSMA using the RTS/CTS procedure together and form a network in the autonomous and decentralized communication environment in which a control station is not provided.

As illustrated in the figure, the wireless communication device 100 comprises an interface 101, a data buffer 102, a central control unit 103, a beacon generating unit 104, a radio transmitter unit 106, a timing control unit 107, an antenna 109, a radio receiver unit 110, a beacon analyzing unit 112, and an information storing unit 113.

The interface 101 exchanges varied information between it and external equipment (e.g. personal computer (not shown)) connected to this wireless communication device 100.

The data buffer 102 is used to temporarily store data transmitted from connected equipment through the interface 101 or data received through a wireless transmission channel before the data is sent out through the interface 101.

The central control unit 103 manages a series of information transmission and reception processing in the wireless communication device 100 and controls accesses to the transmission channel in a centralized manner. In the central control unit 103, for example, access control is carried out based on CSMA with the RTS/CTS procedure used together. In this embodiment, transmitting and receiving procedures wherein a plurality of types of frames, such as RTS, CTS, DATA, and ACK, are multiplexed are implemented. These procedures will be described in detail below.

The beacon generating unit 104 generates beacon signals periodically exchanged between the wireless communication device 100 and nearby wireless communication devices.

The radio transmitter unit 106 includes: a modulator which modulates transmit signals by a predetermined modulation method; a D-A converter which converts digital transmit signals into analog signals; an up converter which up converts analog transmit signals by frequency conversion; a power amplifier (PA) which amplifies the power of up converted transmit signals; and the like. (None of these items is shown in the figure.). The radio transmitter unit 106 wirelessly transmits data temporarily stored in the data buffer 102 and beacon signals at a predetermined transmission rate.

The radio receiver unit 110 comprises: a low noise amplifier (LNA) which voltage amplifies signals received from other stations through the antenna 109; a down converter which down converts voltage amplified receive signals by frequency conversion; an automatic gain controller (AGC); an A-D converter which converts analog receive signals into digital signals; a synchronization circuit for obtaining synchronism, a channel estimation circuit, and a demodulator which carries out demodulation by a predetermined demodulation method; and the like. (None of these items is shown in the figure.) The radio receiver unit 110 receives signals, such as information and beacons, transmitted from other wireless communication devices during predetermined periods.

As radio transmission and reception methods for the radio transmitter unit 106 and the radio receiver unit 110, for example, various transmission methods which are applicable to wireless LANs and suitable for relatively short distance communication can be applied. Specifically, the UWB (Ultra Wide Band) method, OFDM (Orthogonal Frequency Division Multiplexing) method, CDMA (Code Division Multiple Access) method, and the like can be adopted.

The antenna 109 wirelessly transmits signals directed to other wireless communication devices on a predetermined frequency channel. Or, the antenna 109 gathers signals sent from other wireless communication devices. In this embodiment, the wireless communication device 100 is provided with a single antenna and is incapable of carrying out transmission and reception in parallel.

The timing control unit 107 controls timing with which radio signals are transmitted and received. For example, it controls the following timing: transmission timing and reception timing for various packets of RTS, CTS, DATA, ACK, and the like and packets in which these are multiplexed; timing with which the wireless communication device 100 transmits beacons; timing with which beacons are received from other stations; and the like.

The beacon analyzing unit 112 analyzes beacon signals which could be received from neighbor stations, and analyzes the presence of nearby wireless communication devices and the like. For example, such information as reception timing for beacons of neighbor stations and nearby beacon reception timing, is stored as nearby device information in the information storing unit 113.

The information storing unit 113 stores the following: execution procedure instructions (programs wherein the collision avoidance procedure and the like are described) for a series of access control operation and the like, performed in the central control unit 103; nearby device information obtained from the result of analyses of received beacons; and the like.

B. Frame Format (Packet Format)

Figure 3:
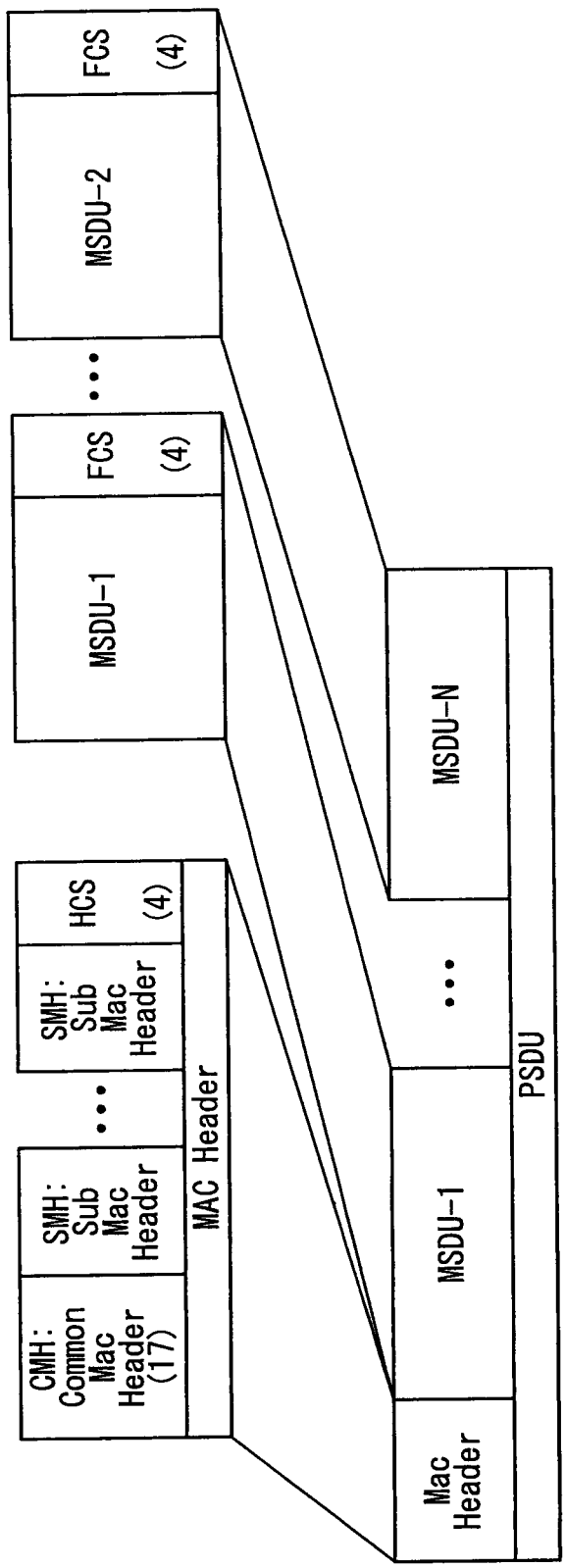
FIG. 3 is a drawing illustrating an example of a frame format used in a wireless communication system according to the present invention.
Figure 15:
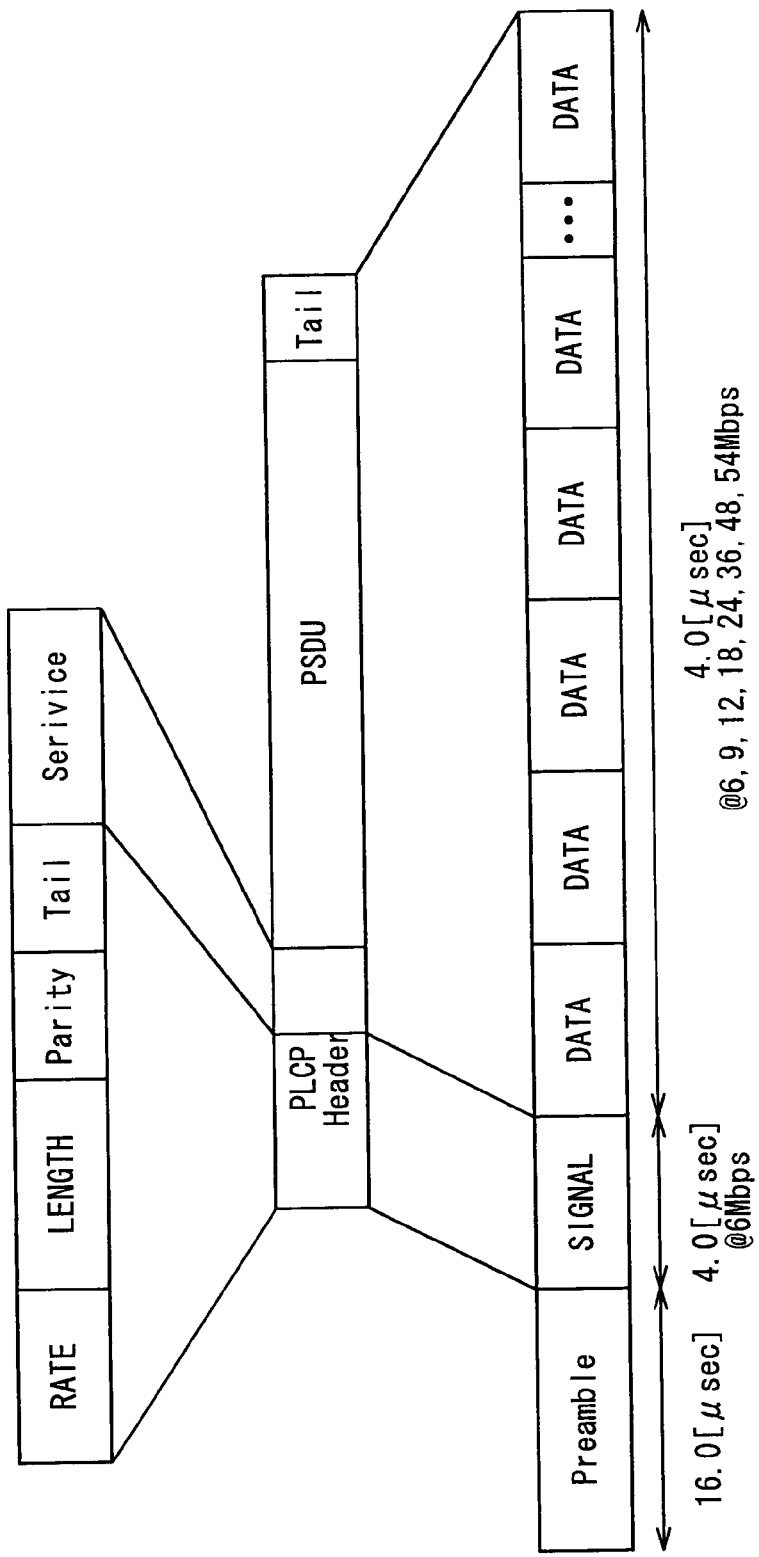
Figure 17:
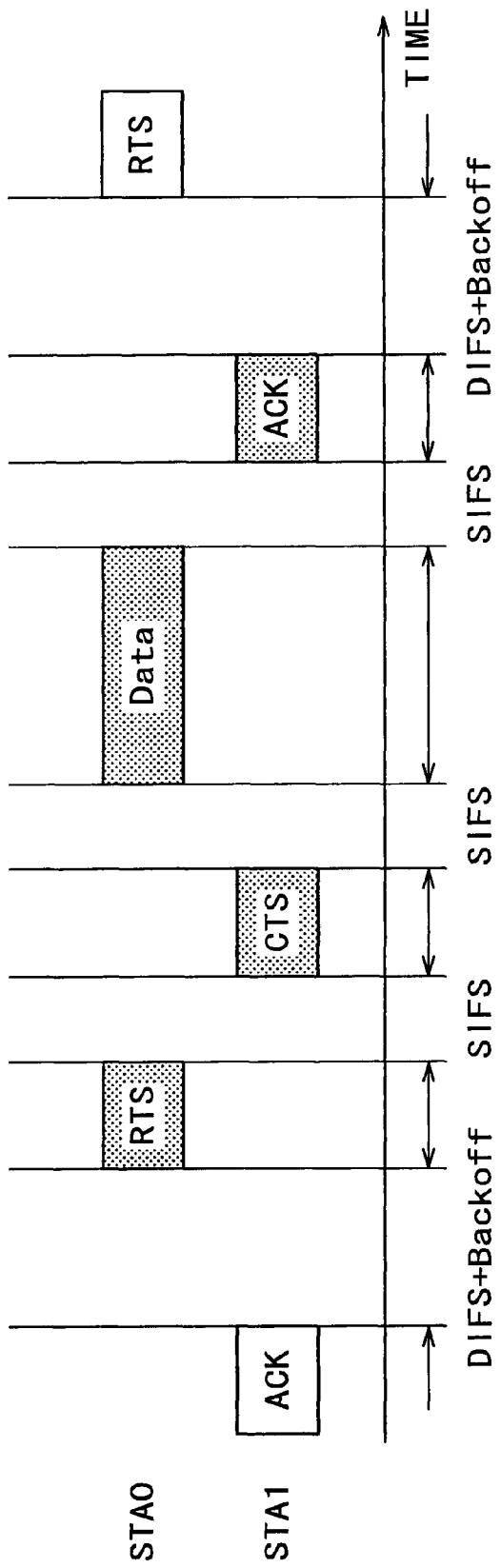
FIG. 17 is a drawing schematically illustrating an example of the operation of the RTS/CTS procedure.
Figure 18:
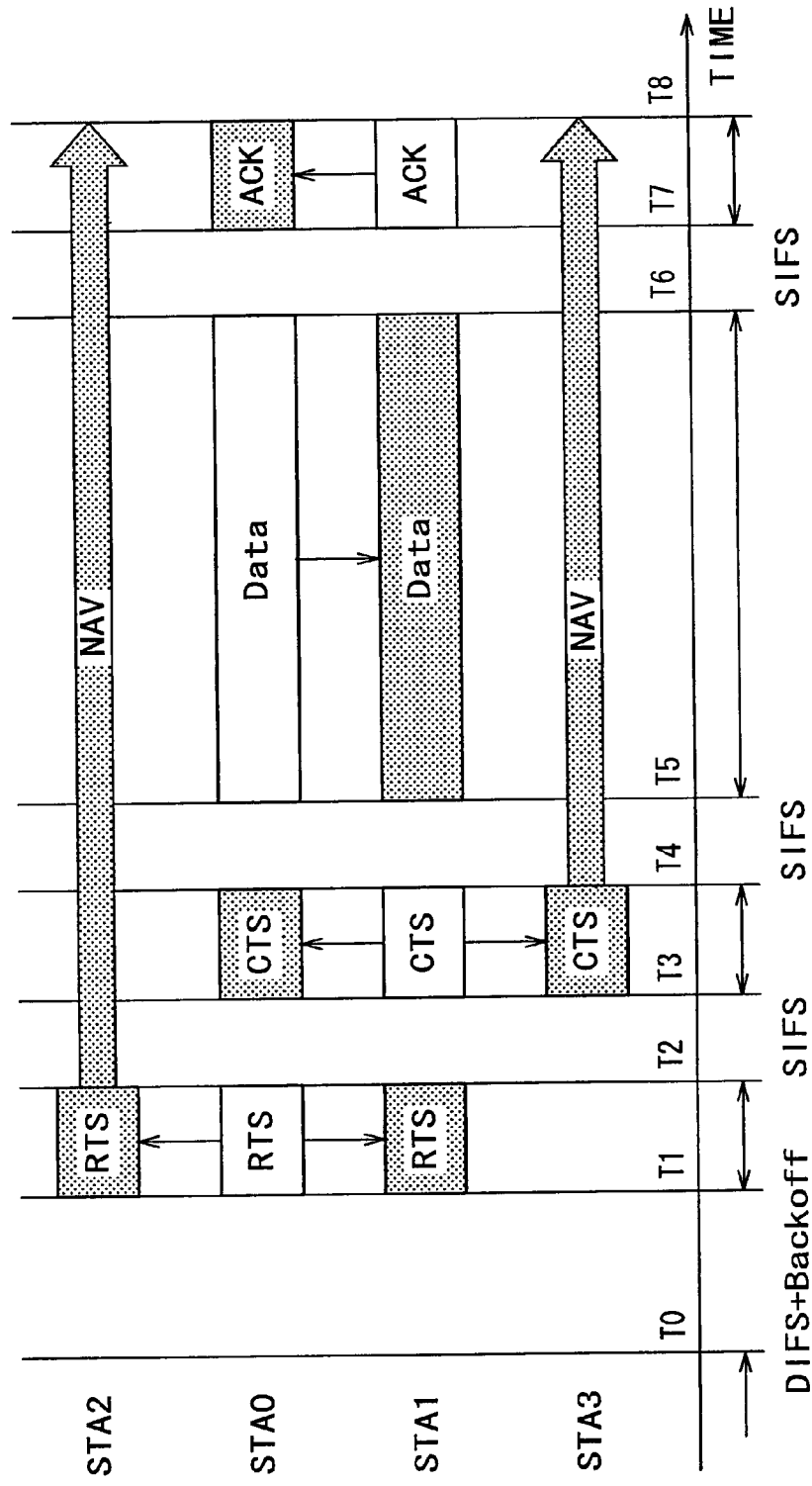
FIG. 18 is a drawing explaining the action which can occur at surrounding stations when the RTS/CTS procedure is carried out between the transmitter station and the receiver station.
Figure 19:
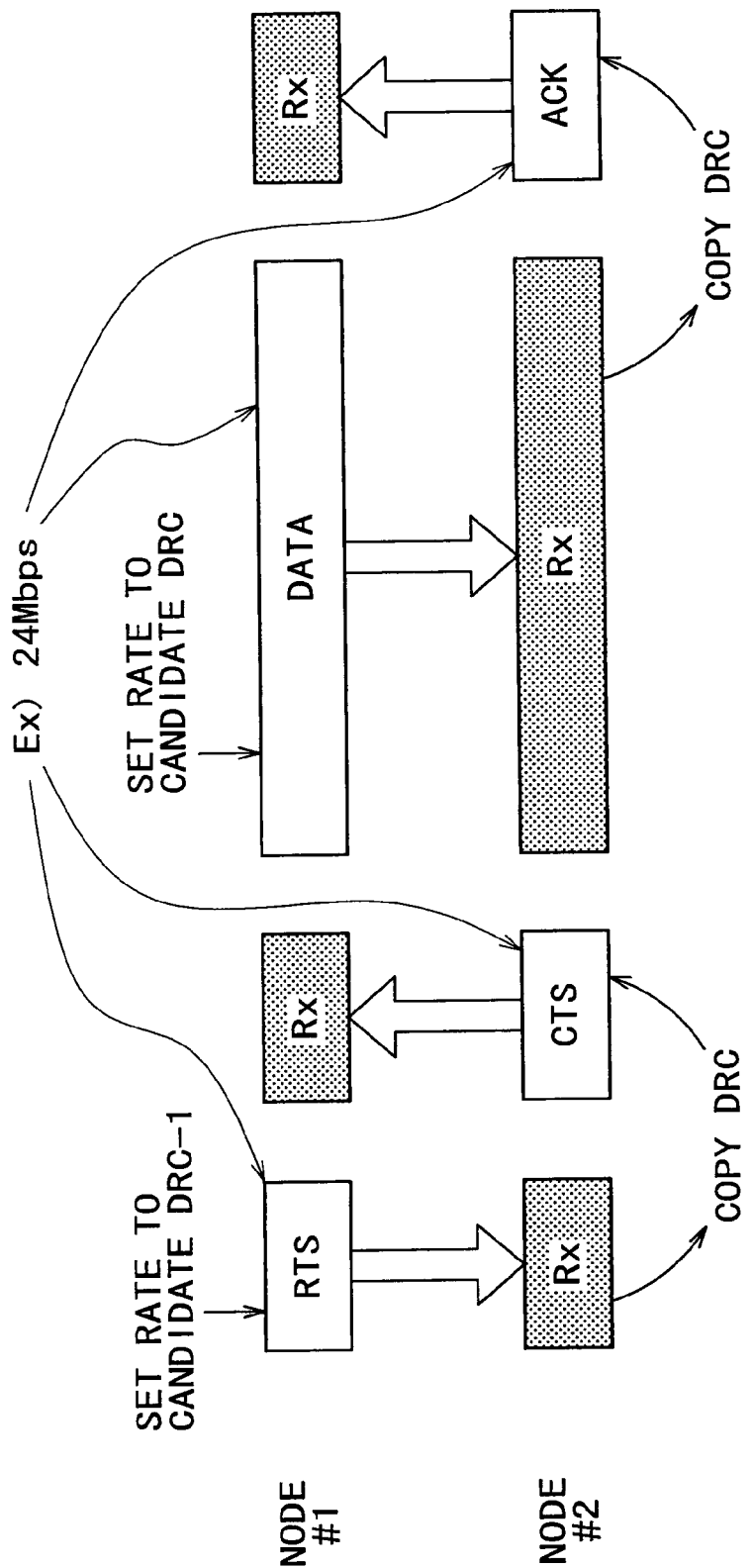
FIG. 19 is a drawing explaining the procedure for determining the transmission rate mode of the entire transaction when STA0 as the origin of transmission transmits an RTS.

FIG. 3 illustrates an example of the constitution of frame format used in a wireless communication system according to the present invention. However, in this figure, the preamble, PLCP header, and the like illustrated in FIG. 15 are omitted, and only the portion represented as PSDU (PHY Service Data Unit) is selected and shown.

As illustrated in the figure, the PSDU comprises MAC header portion and MSDU (MAC Service Data Unit: one data unit passed from the upper level layer) portion. In this embodiment, a plurality of MSDUs can be placed in one PSDU. The MAC header portion comprises common MAC header portion, sub MAC header portion, and HCS (Header Check Sequence) portion. As sub MAC header, a plurality of sub MAC headers can be placed.

Figure 4:
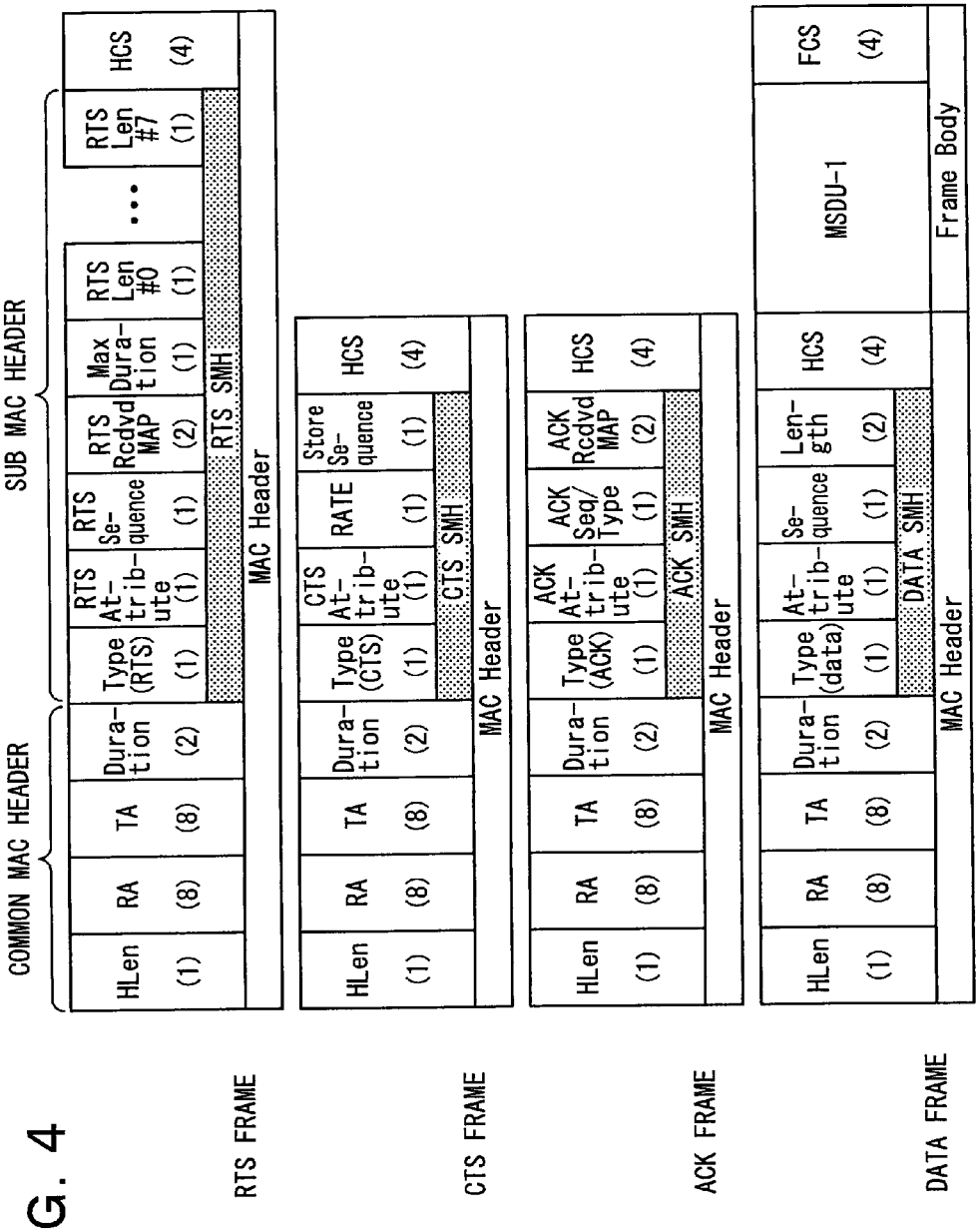
FIG. 4 is a drawing illustrating an example of the constitution of PSDU.

FIG. 4 illustrates an example of the constitution of PSDU in this embodiment. These frame examples correspond to conventional RTS frame, CTS frame, ACK frame, and data frame, respectively. (Refer to FIG. 16.)

The header length (HLen), destination address (RA), transmission origin address (TA), and Duration defined in each frame in common correspond to the common MAC header portion. Table 2 indicates the fields in the common MAC header portion in detail.

TABLE 2

| Field Name | Length [Bit] | Description |
| --- | --- | --- |
| H LENGTH | 1 | MAC header length. Up to 255 bytes. Refer to this value to determine to what extent the CRC computation for HCS should be carried out. |
| RA | 8 | The destination address of the relevant packet. If this is not matched with the relevant packet's ID or broadcast ID, decoding is immediately stopped. |
| TA | 8 | The transmission origin address of the relevant packet. |
| Duration | 2 | Field indicating for what period of time in [μsec] reception is expected to last after the completion of transmission of the relevant PHY burst. This is used for the receiver station to indicate a period for which it can transmit and for surrounding other stations to set a NAV. |

The sub MAC header portion is defined in different formats depending on the purpose of each frame. For example, in a packet corresponding to RTS frame, RTS SMH (Sub MAC Header) is placed as sub MAC header; in a packet corresponding to CTS frame, CTS SMH is placed as sub MAC header; in a packet corresponding to ACK frame, ACK SMH is placed as sub MAC header; and in a packet corresponding to data frame, DATA SMH is placed as sub MAC header.

With respect to the RTS, CTS, and ACK frames, PSDU is constituted only of the MAC header portion, and the MSDU does not exist. To the data frame, data specified by the DATA SMH is added as frame body.

Figure 5:
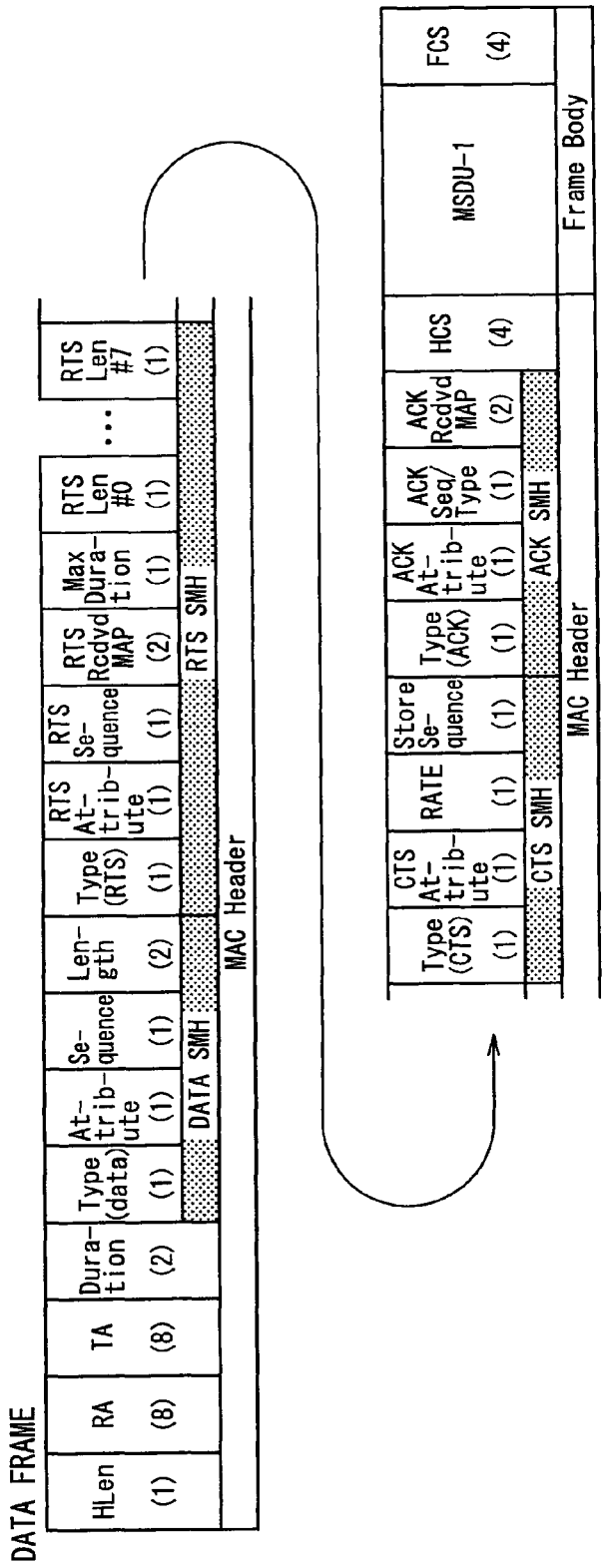
FIG. 5 is a drawing illustrating several examples of PSDUs which can be defined.

FIG. 5 illustrates several examples of PSDUs which can be defined in the present invention. In the uppermost tier in FIG. 5, a packet in which two MSDUs are multiplexed is shown. In the second tier, a packet in which one MSDU and RTS information are multiplexed is shown. In the third tier, a packet in which CTS information and ACK information are multiplexed is shown. In the lowermost tier, a packet in which one MSDU, RTS information, CTS information, and ACK information are multiplexed is shown.

If an RTS is to be transmitted, an RTS SMH is added as SMH; if a CTS is to be transmitted, a CTS SMH is added as SMH; if an ACK is transmitted, an ACK SMH is added as SMH; and if data units are to be transmitted, DATA SMHs are added by a number equivalent to the number of data units to be transmitted. Thus, pieces of information, such as RTS, CTS, DATA, and ACK, having different purposes can be multiplexed into one packet.

Next, the details of the components of each SMH will be described referring to Table 3 to Table 6. The leading field of each SMH is Type field, in which an identifier indicating what information is contained in the relevant SMH is described. The length of SMH differs depending on the type of SMH. Since the SMH has an intrinsic length with respect to each Type, however, the receiving end can learn the length of the relevant SMH by referring to the Type field.

Fields in DATA SMH:

Table 3 illustrates the details of the fields in DATA SMH used when general-purpose data, other than RTS, CTS, and ACK, is transmitted. As illustrated below, the DATA SMH comprises Attribute, Sequence, and Length fields.

TABLE 3

| Field Name | Length [Bit] | Description |
| --- | --- | --- |
| Type | 1 | Identifier indicating that this is an SMH for general-purpose data transmission. |
| Attribute | 1 | Identifier indicating the attribute of the data specified by the SMH. [2] Data Flow [2] ACK Type [1] More Bit [3] Fragment |
| Sequence | 1 | The sequence number of the data specified by the SMH. Rotation of 0 to 255 is repeated. |
| Length | 2 | Indicates the length in byte of the data specified by the SMH. |

In the Attribute field, the identifier indicating the attribute of the data specified by the relevant DATA SMH is described.

In the Data Flow portion, the data flow of the relevant data is placed. Here, it is assumed that data flows having a plurality of attributes on a link-by-link basis can be defined. Data flows having different attributes are used to define different ARQ (Automatic Repeat reQuest) methods on a data flow-by-data flow basis, to handle traffic different in priority from data flow to data flow, and to attain the like intended purposes.

In the ACK Type portion, information which indicates what ACK the receiver that received the data should be requested to return is placed. Specifically, three types of information, immediate ACK (Im-ACK) request, delay ACK (Del-ACK) request, and ACK not required, are notified. If the immediate ACK request is specified, the receiving end returns a packet containing ACK information immediately after it receives data. If the delay ACK request is specified, preparations for returning ACK are made but the transmission of ACK information is not carried out until a packet of some kind is transmitted to the origin of transmission of data. (When a packet of some kind other than RTS is transmitted to the origin of transmission of data, an ACK SMH is added to the packet and it is transmitted.) If ACK not required is notified, an ACK is not returned.

In the More Bit portion, information indicating whether, after the relevant packet is transmitted, more data to be transmitted has been accumulated or not is placed. The receiver stores the address of the packet transmitting station at which the More Bit portion has been most recently set, and, in some cases, polls that station. The polling procedure is not related directly to the subject matter of the present invention, and thus further description will not be given.

If the relevant data is fragmented, the Fragment portion is used to indicate borders in the data.

In the Sequence field, the sequence number assigned to the relevant data is placed. It is assumed that sequence numbers 0, 1, 2, 3, ... are assigned to data units in ascending order as is performed in ordinary data communication. The sequence numbers of 0 to 255 are repeatedly used by rotation.

In the Length field, the length of the relevant data is placed.
Fields in ACK SMH:

Table 4 illustrates the components of ACK SMH fields used when ACK information is transmitted. As described below, the ACK SMH comprises ACK Attribute, ACK Sequence/Type, and Received MAP fields.

TABLE 4

| Field Name | Length [Bit] | Description |
|---|---|---|
| Type | 1 | Identifier indicating that this is an ACK SMH. |
| ACK Attribute | 1 | Identifier indicating the attribute of ACK. [2] Data Flow [6] Reserved |
| ACK Sequence/Type | 1 | Transcribes DATA Type of the object of ACK if DATA Flow is 0. Describes sequence number in the other cases. |
| Received MAP | 2 | Used when Data Flow is not 0. ACK/NACK information for Selective ACK. |

In the ACK Attribute field, the identifier indicating the attribute of ACK is described. The Data Flow portion indicates in which data flow the data as the object of ACK information is transmitted. Here it is assumed that, if data flow 0 is selected, immediate ACK (Im-ACK) is used, and if any other data flow is selected, selective ACK (Sel-ACK) is used.

The ACK Sequence/Type field is a field for indicating up to which sequence number of the relevant data flow has been sequentially received if the data flow is not 0. For example, the value of 6 is placed, that indicates data of up to sequence number 6 has been all successfully received. If 0 is selected for data flow, immediate ACK is used, and the data type of that data is transcribed to indicate which data the ACK is for.

The Received MAP field is a field for indicating whether any data that has been received after the data indicated by the ACK Sequence exists or not. Relative to the sequence number indicated by the ACK Sequence, the subsequent sequence numbers are brought into correspondence by bit map, and bits corresponding to data (sequence number) which has been received are marked. The MSB corresponds to the number next to the sequence number indicated by the ACK Sequence. As an example, it is assumed that: the Received MAP field is constituted of eight bits; the sequence number in the ACK Sequence field is 23; and the Received MAP is 00100000. This means the following: data of up to #23 has been all received; (the Received MAP represents the success or failure in receiving the eight pieces of data of #24 and the following numbers by bit map); the reception of data of #24 and #25 failed; data of #26 has been received; and the subsequent data has not been received.

The method of transmission and reception wherein data units received at intervals are held at the receiving end is designated as selective acknowledgement (Selective ACK). If the receiver supports selective acknowledgement, a Received MAP is generated in accordance with the above-mentioned rule. If the receiver does not support selective acknowledgement, data which could not sequentially received is discarded, and zero is placed in all the bits of the Received MAP field.
Fields in RTS SMH:

Table 5 illustrates the components of RTS SMH fields used when RTS information is transmitted. As described below, the RTS SMH comprises RTS Attribute, RTS Sequence, RTS Received MAP, Max Duration, and Length (or Number Of Data Unit) fields.

TABLE 5

| Field Name | Length [Bit] | Description |
|---|---|---|
| Type | 1 | Identifier indicating that this is a (Directed) RTS SMH. |
| RTS Attribute | 1 | Identifier indicating the attribute of RTS. [2] Data Flow [2] Rate Strategy [1] Rate Set [1] RTS/CTS Mux [1] ACK Request [1] Reserved |
| RTS Sequence | 1 | The sequence number of the leading MSDU to be transmitted. |
| RTS Received MAP | 2 | With respect to MSDUs subsequent to RTS Sequence, the bit corresponding to data recognized to have been transmitted is marked with "1." |
| Max Duration | 1 | The maximum data transmission time which can be allowed by the transmitting end. |
| Length | 1 × N | Information related to data unit to be transmitted (value indicating the data length information). |
| (Number of Data Unit) | 1 | (For example, if the data units are of fixed length) the number of data units to be transmitted. |
| (Directed Address) | 8 | (Only in case of Directed RTS) the MAC address of the node as the object of RTS. |

In the RTS Attribute field, the identifier indicating the attribute of the RTS information is described.

In the Data Flow portion, the data flow of data for which transmission is about to be tried is placed.

In the Rate Strategy portion, auxiliary information is placed which is referred to when the transmission rate of data is determined. This auxiliary information is used to bias criteria for determining: whether to aggressively select a high rate for transmission rate; whether to slightly aggressively select a slightly high rate; whether to slightly passively select a slightly low rate; or whether to passively select a low rate. The usage of the Rate Strategy portion will be described in detail later.

In the Rate Set portion, indication is placed which indicates whether to fix the transmission rate at the value applied in RTS for transmission or not. If transmission is carried out with the transmission rate fixed, the entry in the Rate Strategy portion is disregarded.

In the RTS/CTS Mux portion, information is placed which indicates whether to permit adding RTS information to a CTS packet transmitted in response to the relevant RTS or not. If the addition of RTS is permitted, the station which receives the relevant RTS and returns a CTS operates as follows: if the station holds data directed to the station as the origin of transmission of the RTS, it is permitted to add RTS information to the CTS and transmit it. Thus, two-way communication is carried out by one transaction.

In the ACK Request portion, information is placed which indicates whether to request to add ACK information to a CTS packet transmitted in response to the relevant RTS or not. If the addition of ACK information is requested, the station which receives the RTS and returns a CTS operates as follow: the station adds the ACK information of data which it has received from the station of the origin of transmission of the RTS to the CTS and transmits it.

The RTS Sequence field is a field in which the sequence number of the leading data of pieces of data for which the station as the origin of transmission tries to transmit is described. The station as the destination of RTS refers to this field. Thereby, the station can learn whether the station as the origin of transmission is trying to transmit data which is a duplicate of the data already received or not.

The RTS Received MAP field produces an effect when selective acknowledgement is used together. Relative to the sequence number indicated in the RTS Sequence field, pieces of data of the subsequent sequence numbers are brought into correspondence by bit map. Then, the bits corresponding to data (sequence numbers) the reception of which the receiver station recognizes to have been completed are marked. The MSB corresponds to the sequence number indicated by RTS Sequence. As an example, it is assumed that: the RTS Received MAP field is constituted of eight bits; the sequence number in the RTS Sequence field is 23; and the Received MAP is 00100000. This means the following: pieces of data of #23, #24, and #25 are skipped, and for pieces of data of #26 and the following numbers, transmission is continuously tried. The station as the destination of RTS refers to this field, and can thereby learn whether the station as the origin of transmission is trying to transmit data which is a duplicate of the data already received.

The Max Duration field is used for the transmitting end to set the maximum period of data transmission in the present data transmission transaction. As an example, it is assumed that, with respect to the present transaction, data transmission is to be completed within 200 microseconds on the grounds of the transmitter station. In this case, a value indicating 200 microseconds (or a value obtained by subtracting the time required for the RTS/CTS procedure from 200 microseconds) is placed in this field. The station as the destination of RTS has right to determine a period of data reception. At this time, the station determines a period of data reception so that the period indicated in the Max Duration field will not be exceeded.

In the Length field, the length of data for which transmission is tried is described. In case of a first example of constitution, a plurality of pieces of Length information (e.g. number of bits and number of bytes) are defined if it is permitted to transmit one or more data units in one packet. Here, it is assumed that, for example, N pieces of Length information are defined. (N is typically a fixed value but may be a non-fixed value.) Data units the reception of which the receiving end recognizes to have been completed are excluded from data for which transmission is tried. As an example, it is assumed that: the sequence number in the RTS Sequence field is 23; and the Received MAP is 00100000. In this case, the length of data unit of #23 is placed in Length0, and the length of data unit of #24 is placed in Length1. In Length2, the length of data unit of #26, not that of data unit of #25 which has been already received, is placed.

As a second example of constitution, the sum of the lengths of a plurality of data units for which transmission is tried can be described as Length information. In this case, in the RTS Sequence field, the sequence number of the leading data of a plurality of data units is described.

As a third example of constitution, the length of data for which transmission is tried can be expressed in time and described in the Length field. In this case, in the Length field, a plurality of lengths of time for which the channel is occupied when data or a plurality of data groups for which transmission is tried are transmitted are described with respect to cases where they are transmitted at several data rates. Here, it is assumed that, for example, N pieces of Length information are defined. (On the assumption that transmission is carried out at N different data rates, the length of time required for data transmission is described.)

As a fourth example of constitution, the Number Of Data Unit field can be defined in place of the Length field if the length of a data unit mainly transmitted is a fixed value. In this case, in the field, the number of data units for which transmission is tried is described.

In the RTS SMH, the Directed Address field can be defined in addition to the foregoing. This is used in the following case: broadcast or multicast is set in the destination (RA) field of the common MAC header but RTS information is to be transmitted to some specific station. In the Directed Address field, the address of the destination of RTS information is described.

Fields in CTS SMH:

Table 6 illustrates the components of CTS SMH fields used when CTS information is transmitted. As described below, the CTS SMH comprises CTS Attribute, RATE, and Stored Sequence fields.

TABLE 6

| Field Name | Length [Bit] | Description |
| --- | --- | --- |
| Type | 1 | Identifier indicating that this is a CTS SMH. |
| CTS Attribute | 1 | Identifier indicating the attribute of CTS. [2] Data Flow [6] Reserved |
| RATE | 1 | Specifies the data rate class of transmit data. |
| Stored Sequence | 1 | Notifies that the Length information of up to the relevant Sequence number has been stored. |

In the CTS Attribute field, the identifier indicating the attribute of the relevant CTS information is described.

In the Data Flow portion, the data flow of data for which transmission is about to be tried is placed.

In the RATE field, a value which indicates the transmission rate of data transmitted in response to the transmission of CTS is placed.

In the Stored Sequence field, the Sequence number is placed which indicates up to what Sequence number the data receiving end (CTS transmitting end) has held data length information. If the relevant communication station is not provided with a function of holding data length information, the number immediately preceding the Sequence number indicated in the RTS Sequence field is placed. Or, a value is placed which represents NULL indicating that the relevant communication station is not provided with a function of holding data length information.

In the example described above, CMH and SMH independently exist in PSDU and a plurality of different types of SMHs are independently added for convenience of explanation. An aspect of the objects of the present invention is attained as long as the format contains the similar components of information; therefore, the present invention is not limited to the above-mentioned format.

An example will be taken. Information elements equivalent to the MAC header are preferably disposed at the head of a packet in a lump, as described above. However, they can be disposed behind or between data units constituting a packet sometimes. In particular, the DATA SMH is disposed immediately before the data unit to which the relevant SMH corresponds in some examples of utilization.

In the examples described above, the RA, TA, and Duration fields are disposed in CMH. However, these fields are disposed in the PLCP portions in some examples of utilization.

C. Transmission Rate Determination Process

Figure 6:
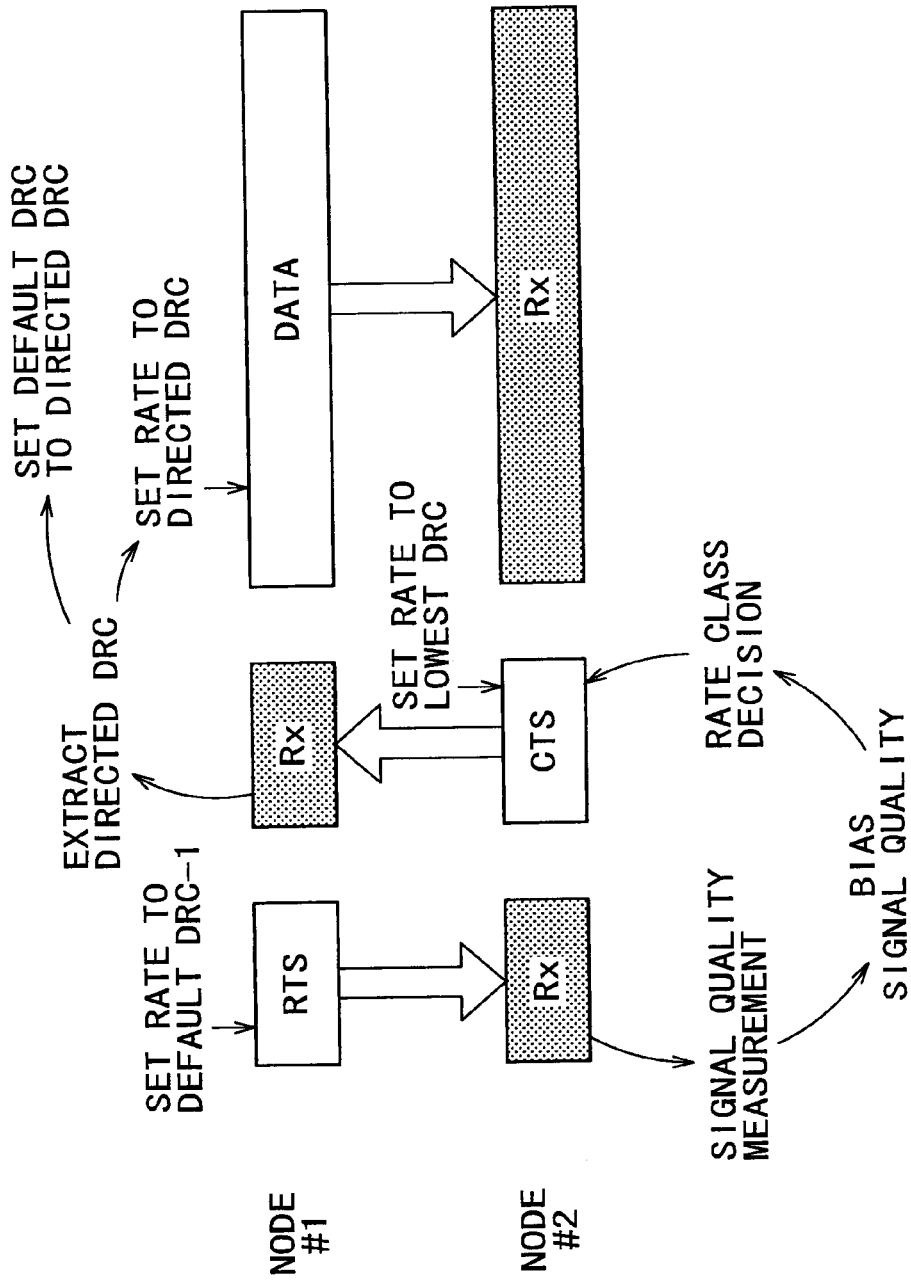
FIG. 6 is a drawing explaining the process for determining a transmission rate in a wireless communication system according to the present invention.

Referring to FIG. 6, description will be given to a process for determining a transmission rate in a wireless communication system according to the present invention.

In the present invention, access control based on CSMA is carried out with the RTS/CTS procedure used together. In such a case, CTS information is transmitted in response to the reception of RTS information, and data is transmitted in response to the reception of CTS. The CTS transmitting station measures the quality of RTS receive signal, and thereby determines a transmission rate at which reception can be implemented and notifies the station as the destination of CTS of it. The station as the destination of CTS transmits data in response to the CTS information. At this time, the station applies the transmission rate indicated in the RATE field in the CTS as the transmission rate of this data. The process for determining the transmission rate is as follows:

Step 1: the quality, such as reception SINR, is measured based on RTS receive signal.

Step 2: the quality or transmission rate class measured according to the value indicated in the Rate Strategy field in RTS is biased, and a transmission rate is determined. In case of IEEE802.11a, for example, it is determined from among eight different transmission rate modes prescribed: 6, 9, 12, 18, 24, 36, and 54 Mbps.

When the measured quality is biased, the measured reception SINR value is biased at the level of several dB in accordance with the value indicated by Rate Strategy. Based on the biased reception SINR value, a transmission rate class at which reception can be implemented is determined by lookup table or the like.

When the transmission rate class is biased, a transmission rate class at which reception can be implemented is extracted by lookup table or the like based on the measured reception SINR value. The extracted transmission rate class is shifted in accordance with the value indicated by Rate Strategy.

This shift processing may be applied, for example, only when a high-rate class is selected or only when a low-rate class is selected depending on the characteristics of the physical layer.

The data transmitting station (RTS transmitting station) which received CTS holds the transmission rate class, specified in the RATE field, as a default transmission rate class directed to the station as the origin of CTS transmission. Thus, the station can refer to it when the station transmits an RTS or data next time. When the station transmits an RTS, it refers to this default transmission rate class, and applies this transmission rate class or the next lower transmission rate class (higher by one level in tolerance to noise). When data is transmitted without using RTS/CTS together, the default transmission rate class is applied in place of the transmission rate class notified by CTS.

When the RTS transmitting station transmits data units, it counts the following with respect to each destination: the number of times when a data unit is transmitted for the first time, and the number of times when a data unit is retransmitted. By referring to these values, the transmission error rate can be extracted with respect to each destination. Based on the destination-by-destination transmission error rates, the Rate Strategy of RTS information can be determined. More specific description will be given. The lower threshold value and the upper threshold value of transmission error rate are defined in advance. If the transmission error rate exceeds the upper threshold value, the value for Rate Strategy is decremented in the passive direction and held. If the transmission error rate falls below the lower threshold value, the value for Rate Strategy is incremented in the aggressive direction and held. When an RTS is transmitted, this held Rate Strategy is transcribed into the Rate Strategy field in RTS. If the held value for Rate Strategy is changed, it is important to reset the count values for obtaining the transmission error rate.

According to the above-mentioned procedure, the transmission rate is determined from the receive signal quality of RTS. Thus, control can be carried out by dual loop wherein the applied transmission rate is biased in accordance with the error rate (bit error rate (BER) or packet error rate (PER)) monitored by the transmitting end.

In addition, as a technique different from the foregoing, the following constitution is possible: the transmission error rate is measured by the receiving end, not by the data (RTS) transmitting end. In this case, the above-mentioned monitoring of error rate is carried out at the receiving end, and similarly dual loop control is carried out wherein the applied transmission rate is biased in accordance with the error rate. If the RTS/CTS procedure is not used together in the technique, however, certain risk is involved. This is because, in an environment where errors frequently occur, the receiving end cannot even recognize that packets are transmitted. Where RTS/CTS is used together, the error rate is computed with the packets received after CTS is transmitted taken as the population parameter.

The quintessence of Rate Strategy is to provide a methodology for communicating auxiliary information for selecting and determining a rate on the grounds of the transmitting end. Where the receiving end measures the transmission error rate, mentioned above, or in the like cases, the transmitting end may set the value of Rate Strategy due to other factors than error rate. For example, the transmitting end may set the value of Rate Strategy due to the difference in transmission power between RTS packet and data packet. Or, it may set the value of Rate Strategy due to the causal relationship between transmission rate and transmission power. (Refer to Japanese Patent Application No. 2003-6973 specification, already assigned to the present applicant, for example.)

D. Basic CSMA Procedure

Figure 7:
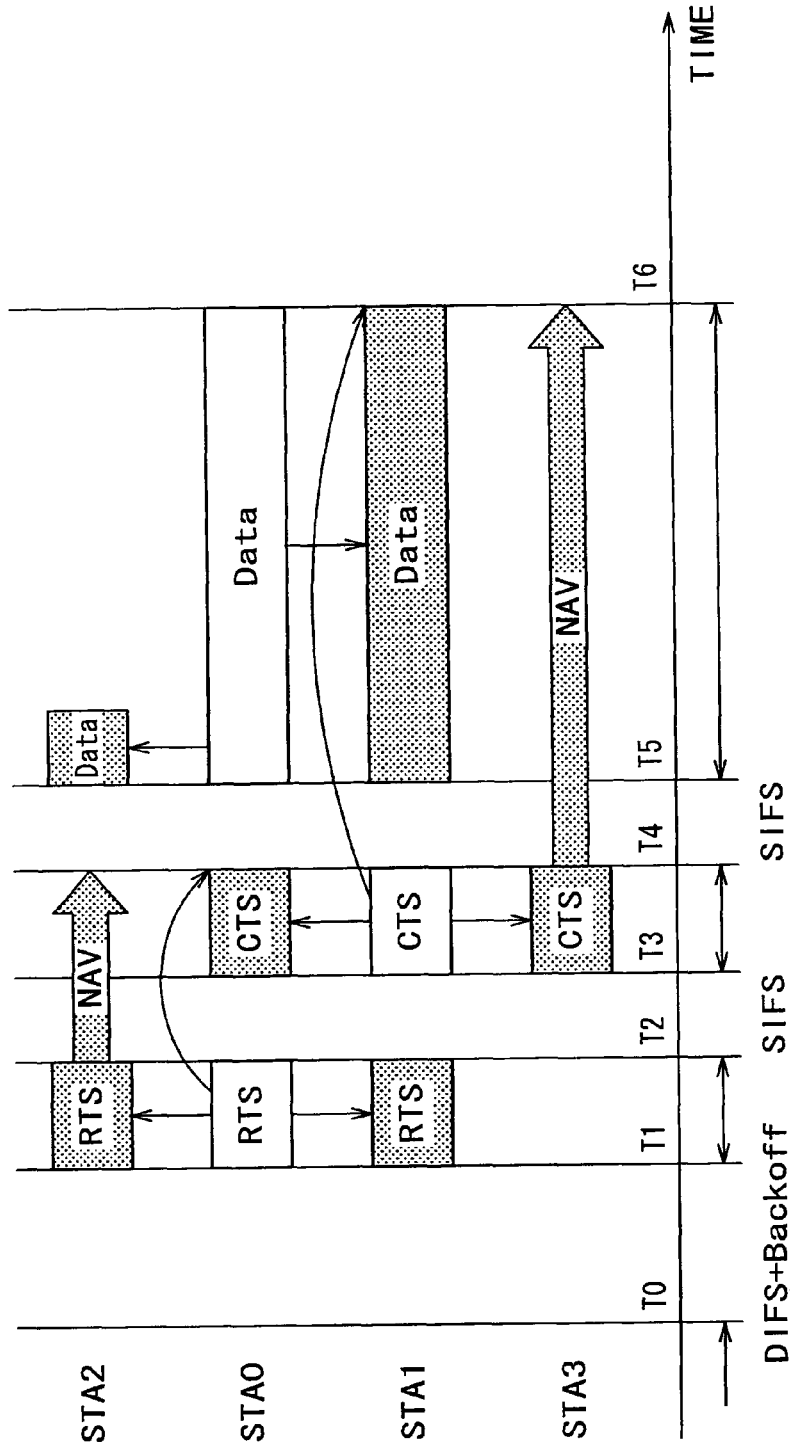
FIG. 7 is a drawing illustrating an example of the operation sequence of the RTS/CTS procedure according to the present invention.

In a wireless communication system according to the present invention, access control based on CSMA is carried out with the RTS/CTS procedure used together. FIG. 7 illustrates an example of the operation sequence of the RTS/CTS procedure in the present invention. In this figure, the following communication environment is assumed: four communication stations, STA2, STA0, STA1, and STA3, exist, and communication station adjoining to each other in the figure are located within the range of radio waves. Here, it is assumed that STA0 desires to transmit information to STA1.

STA0 confirms that the medium is clear for a certain period (from time T0 to time T1) according to, for example, the ordinary CSMA procedure. Then, STA0 starts the transmission of a packet containing RTS information to STA1 at time T1.

In the Duration field in the packet containing the RTS information, the time that lapses before the reception of a packet containing CTS information, transmitted as the outcome of the reception of the RTS information, is completed, is described. (That is, the time from T2 to T4 is described.) At this time, as the length of time described in the Duration field, the time that lapses before time T4 may be given some margin and the time until time T5 or so may be described. Or, the time until time slightly before time T4 may be described.

STA0 holds a list of information on the length of data unit it tries to transmit to STA1. This list is designated as "transmit data unit candidate list."

In case the RTS SMH adopts the first example of constitution mentioned above, in the Length field in the RTS SMH, the lengths (e.g. number of bits and number of bytes) of data units in the transmit data unit candidate list are described as data length information by N pieces.

In case the RTS SMH adopts the second example of constitution, in the Length field in the RTS SMH, the sum of the lengths of one or more data units in the transmit data unit candidate list is described as data length information.

In case the RTS SMH adopts the third example of constitution, in the Length field in the RTS SMH, the length of time required for transmitting the data units in the transmit data unit candidate list is described as data length information. The length of time fluctuates depending on the data rate at which transmission is carried out. Therefore, if transmission is carried out at several data rates, a plurality of lengths of time are described sometimes.

In case the RTS SMH adopts the fourth example of constitution, in the Number Of Data Unit field (defined in place of the Length field) in RTS SMH, the number of data units in the transmit data unit candidate list is described as data length information.

This packet containing RTS information is received also by STA2 which is positioned in the vicinity of STA0. STA2 checks the destination of the common MAC header based on the transmission rate information in the PSDU portion obtained from the RATE field in the PLCP header. If STA2 cannot confirm that the packet is directed to itself, it recognizes time T2 from the RATE field and the LENGTH field in the PLCP header. Further, STA2 refers to the Duration field in the common MAC header, and thus recognizes time T4. Then, STA2 sets an NAV and brings itself in transmission prohibited state until time T4.

This packet containing RTS information is received also by STA1 which is the intended destination. STA1 checks the destination of the common MAC header based on the transmission rate information in the PSDU portion obtained from the RATE field in the PLCP header, and recognizes that the packet is directed to itself. Further, when STA1 successfully decodes the sub MAC header, it recognizes that there is a request from STA0 to send data packets, directed to itself. Then, STA1 determines a transmission rate based on information obtained from the received packet containing RTS information.

Further, STA1 refers to the Length field (or the Number Of Data Unit field) in RTS SMH, and thereby obtains the data length information on the data to be received.

In case the RTS SMH adopts the above-mentioned first example of constitution, STA1 obtains a list of information on the lengths of data units to be received. This list is designated as "receive data unit candidate list." STA1 refers to this list in sequence. Thereby, it counts the number of data units which can be received if reception is carried out at the determined transmission rate and a reception period to the extent that the period indicated in the Max Duration field in RTS SMH is not exceeded. (This reception period is the time period until time T6 when the transmission of data packets is completed.)

In case the RTS SMH adopts the second example of constitution, STA1 obtains the total length of one or more data units received. STA1 counts the reception period to the extent that the period indicated in the Max Duration field in RTS SMH is not exceeded. At this time, consideration is given to whether data unit groups of the indicated length can be received if reception is carried out at the determined transmission rate.

In case the RTS SMH adopts the third example of constitution, STA1 obtains time length candidates of data packets received. STA1 extracts one reception period (time length) corresponding to the determined transmission rate from the Length field.

In case the RTS SMH adopts the fourth example of constitution, STA1 obtains information on the number of data units received from the Number Of Data Unit field. Where the length of data units is uniquely fixed, this information is equivalent to the "receive data unit candidate list." STA1 refers to the length and number of data units. Thereby, it counts the number of data units which can be received if reception is carried out at the determined transmission rate and the reception period to the extent that the period indicated in the Max Duration field in RTS SMH is not exceeded.

If STA1 desires to limit the reception period on the grounds of itself at this time, it sets this reception period as the threshold value of reception period, together with the period indicated by Max Duration, sometimes. Further, STA1 transmits a packet containing CTS information. Thus, it transcribes the value obtained by the reception period computed here into the Duration field in that packet, and transcribes the transmission rate class determined as mentioned above into the RATE field.

The packet itself containing CTS information is transmitted at a transmission rate most superior in noise tolerance in many cases. Thus, the possibility that a packet containing CTS information cannot be decoded is reduced as much as possible.

If STA1 fails to decode a packet containing RTS information, a packet containing CTS information is not returned by due time T4. Therefore, STA0 retries to transmit the packet containing RTS information in accordance with the random backoff procedure. At this time, STA2 puts down the NAV at time T4, and transitions into normal state in which it can transmit. Thus, damage resulting from that the packet containing CTS information is not returned is minimized.

If STA1 succeeds in decoding the packet containing RTS information, a packet containing CTS information is returned to STA0 at time T4 as scheduled in accordance with the above-mentioned procedure.

This packet containing CTS information is received also by STA3 which is positioned in the vicinity of STA1. STA3 decodes the Duration field and the like in the packet containing CTS information, and refers to the RA address. If STA3 cannot confirm that the packet is directed to itself as the result, it sets an NAV and stops transmission over the time indicated in the Duration field or the like. As a result, STA3 is kept in transmission prohibited state until time T6 which is the time indicated in the Duration field.

This packet containing CTS information is received also by STA0 which is the intended destination. STA0 decodes the PSDU, and thereby recognizes the following: STA1 is ready to receive and it desires to receive at the transmission rate indicated in the RATE field during the period indicated by Duration. STA0 calls data units which can be transmitted at the specified transmission rate during the specified period, beginning with the first one in the transmit data unit candidate list in sequence. Then, it generates a transmit data packet, and transmits it.

The data packet transmission is completed at time T6, and STA3 which is a neighbor station of STA1 refrains from transmission until T6. Therefore, the reception by STA1 is not hindered.

E. Applications of CSMA Procedure

FIG. 8 to FIG. 10 and FIG. 21 to FIG. 23 illustrate a number of examples of the applications of transmitting and receiving procedures according to the present invention. Here, examples of the applications of the communication method according to the present invention will be described in detail based on the CSMA procedure described referring to FIG. 7.

E-1. First Example of Application

Figure 8:
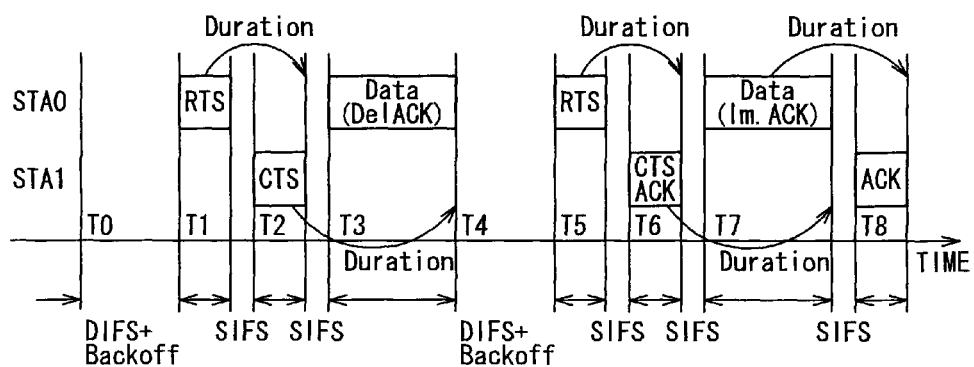
FIG. 8 is a drawing illustrating an example of the application of transmitting and receiving procedures according to the present invention.

FIG. 8 illustrates the first example of application of transmitting and receiving procedures in a wireless communication system according to the present invention. The figure illustrates an example in which two data units are transmitted from STA0 to STA1. In this example, the number of data units which can be transmitted in one packet is limited to one, and delay ACK (Del-ACK) or immediate ACK (Im-ACK) is specified as the case may be.

STA0 starts the procedure for transmitting data units at time T0, and starts backoff count in accordance with the CSMA procedure for acquiring transmission right. The backoff count is completed at T1, and it is confirmed that the medium is clear during this period. Therefore, STA0 transmits a packet containing RTS information.

After STA1 receives the RTS directed to itself, it returns a packet containing CTS information at time T2 based on the information described in the RTS SMH.

After STA0 receives the CTS directed to itself, it transmits a data packet at time T3. At this time, STA0 describes in the ACK Type portion of the data packet information indicating it desires that ACK should be returned by delay ACK (Del-ACK). At the same time, STA0 describes in the More Bit portion information indicating that more data unit is stored. This data packet is received by STA1 without error.

To further transmit the stored data unit directed to STA1, STA0 waits for a random time, and then transmits a packet containing RTS information at time T5. At this point of time, STA0 has not received the ACK of the data unit it previously transmitted. Therefore, STA0 generates a transmit data unit candidate list so that the previously transmitted data unit is included, and constitutes an RTS SMH based on the list.

After STA1 receives it, its returns a packet containing CTS information at time T6 based on the information described in the RTS SMH. At this time, STA1 refers to the RTS Sequence and RTS Received MAP in the RTS SMH, and thereby recognizes that STA0 has not recognized the reception confirmation of the previously received data unit. Then, STA1 decides to include ACK information in the packet containing CTS information. Or, STA1 determines to include ACK information because of it's holding untransmitted ACK directed to STA0. Further, STA1 deletes the already received packet from the receive data unit candidate list to update the list, and then generates CTS information.

As a result, STA1 returns a packet (i.e. CTS with ACK multiplexed) containing the CTS information and the ACK information at time T6. For ACK information, the ACK information corresponding to the data flow specified by the received RTS information is described.

After receiving the packet containing the CTS information and ACK information, STA0 operates as follows: based on the ACK information, STA0 deletes the data unit already received by STA1 from the transmit data unit candidate list it holds; STA0 generates anew transmit data unit candidate list, and determines a transmit data unit based on the new list. STA0 transmits the thus generated data packet at T7. At this time, it describes in the ACK Type portion of the data packet information indicating it desires that ACK should be returned by immediate ACK. At the same time, it describes in the More Bit portion information indicating that a data unit to be transmitted is not present any more.

When STA1 receives the data packet, it recognizes that it is desired to immediately transmit an ACK, from the ACK Type portion in the DATA SMH. Then, STA1 returns an immediate ACK (Im-ACK) packet corresponding to the relevant data flow at time T8.

In this example of application, the Duration field in each packet is set so that it indicates the time period until the time indicated by arcuate arrow in FIG. 8.

E-2. Second Example of Application

FIG. 21 illustrates the second example of application of transmitting and receiving procedures in a wireless communication system according to the present invention. The figure illustrates an example in which two data units are transmitted from STA0 to STA1. This example is on the assumption that the number of data units which can be transmitted in one packet is limited to one and immediate ACK (Im-ACK) is constantly applied.

STA0 starts the procedure for transmitting data units at time T0, and starts backoff count in accordance with the CSMA procedure for acquiring transmission right. The backoff count is completed at T1, and it is confirmed that the medium is clear during this period. Therefore, STA0 transmits a packet containing RTS information.

After STA1 receives the RTS directed to itself, it returns a packet containing CTS information at time T2 based on the information described in the RTS SMH.

After STA0 receives the CTS directed to itself at time T2, it transmits a data packet at time T3. At this time, STA0 describes in the ACK Type portion of the data packet information indicating it desires that ACK should be returned by immediate ACK (Im-ACK).

However, STA1 detects an error when it receives the data packet and cannot accurately extract the data. Though STA1 should return an ACK, therefore, it does not transmit an ACK at time T4. (The ACK in the figure is not transmitted.)

Since STA0 cannot receive ACK at due time, it judges that some error has occurred in the previous data. Thus, to retransmit the still stored data unit directed to STA1, STA0 waits for a random time, and then transmits a packet containing the RTS information at time T5. As mentioned above, STA0 has not received the ACK of the data it previously transmitted. At this time, therefore, STA0 describes in the ACK Request portion in the RTS SMH that it requests that ACK information should be added. (That is, STA0 transmits an RTS with an ACK request multiplexed.)

After receiving this, STA1 returns a packet containing CTS information at time T6 based on the information described in the RTS SMH. At this time, STA1 refers to the ACK Request portion in the RTS SMH, and thereby recognizes that STA0 is requesting that ACK information should be transmitted.

Then, STA1 decides to include ACK information in the packet containing CTS information. Further, STA1 deletes the already received packet from the receive data unit candidate list to update the list, and then generates CTS information.

As a result, STA1 returns a packet (i.e. CTS with ACK multiplexed) containing the CTS information and the ACK information at time T6. For ACK information, the ACK information corresponding to the data flow specified by the received RTS information is described.

After receiving the packet containing the CTS information and the ACK information, STA0 operates as follows: based on the ACK information, STA0 deletes the data unit already received by STA1 from the transmit data unit candidate list it holds; STA0 generates a new transmit data unit candidate list, and determines a transmit data unit based on the new list. (In this example, STA0 retransmits the data unit it transmitted at time T3.) STA0 transmits the thus generated data packet at time T7. At this time, it describes in the ACK Type portion of the data packet information indicating it desires that ACK should be returned by immediate ACK.

When STA1 receives the data packet, it recognizes that it is desired to immediately transmit an ACK, from the ACK Type portion in the DATA SMH. Then, STA1 returns an immediate ACK (Im-ACK) packet corresponding to the relevant data flow at time T8.

In this example of application, the Duration field in each packet is set so that it indicates the time period until the time indicated by arcuate arrow in FIG. 8.

E-3. Third Example of Application

FIG. 22 illustrates the third example of application of transmitting and receiving procedures in a wireless communication system according to the present invention. The figure illustrates an example in which one data unit is transmitted from STA0 to STA1. This example is on the assumption that the number of data units which can be transmitted in one packet is limited to one and immediate ACK (Im-ACK) is constantly applied.

STA0 starts the procedure for transmitting data units at time T0, and starts backoff count in accordance with the CSMA procedure for acquiring transmission right. The backoff count is completed at T1, and it is confirmed that the medium is clear during this period. Therefore, STA0 transmits a packet containing RTS information.

After STA1 receives the RTS directed to itself, it returns a packet containing CTS information at time T2 based on the information described in the RTS SMH.

After STA0 receives the CTS directed to itself at time T2, it transmits a data packet at time T3. At this time, STA0 describes in the ACK Type portion of the data packet information indicating it desires that ACK should be returned by immediate ACK (Im-ACK). At the same time, STA0 describes in the More Bit portion information indicating that a transmit data unit is not stored any more. This data packet is received by STA1 without error.

STA1 returns the ACK of the received data. However, STA0 detects an error when it receives the ACK and cannot accurately extract the data. Since STA0 cannot receive ACK at due time, it judges that some error has occurred in the previous data. Thus, to retransmit the still stored data unit directed to STA1, STA0 waits for a random time, and then transmits a packet containing RTS information for data retransmission at T5. As mentioned above, STA0 has not received the ACK of the data it previously transmitted. At this time, therefore, STA0 describes in the ACK Request portion in the RTS SMH that it requests that ACK information should be added. That is, STA0 transmits an RTS with an ACK request multiplexed.

After receiving this, STA1 returns a packet containing CTS information at time T6 based on the information described in the RTS SMH. At this time, STA1 refers to the ACK Request portion in the RTS SMH, and thereby recognizes that STA0 is requesting that ACK information should be transmitted. Then, STA1 decides to include ACK information in the packet containing CTS information. Further, STA1 recognizes that, as the result of the already received packet being deleted from the receive data unit candidate list, all the data STA0 desires to transmit has been already received. Thus, STA1 returns only an ACK, and does not return CTS information.

As a result, STA1 returns a packet containing only ACK information at time T6. For ACK information, the ACK information corresponding to the data flow specified by the received RTS information is described.

After receiving the packet containing the ACK information, STA0 judges that all the transmit data unit directed to STA1 it has held has been already transmitted, and terminates the transaction.

In this example of application, the Duration field in each packet is set so that it indicates the time period until the time indicated by arcuate arrow in FIG. 8.

E-4. Fourth Example of Application

FIG. 23 illustrates the fourth example of application of transmitting and receiving procedures in a wireless communication system according to the present invention. The figure illustrates an example in which two data units are transmitted from STA0 to STA1. This example is on the assumption that the number of data units which can be transmitted in one packet is limited to one and it is permitted to continuously transmit a plurality of data packets.

STA0 starts the procedure for transmitting data units at time T0, and starts backoff count in accordance with the CSMA procedure for acquiring transmission right. The backoff count is completed at T1, and it is confirmed that the medium is clear during this period. Therefore, STA0 transmits a packet containing RTS information.

After STA1 receives the RTS directed to itself, it returns a packet containing CTS information at time T2 based on the information described in the RTS SMH.

After STA0 receives the CTS directed to itself, it transmits a data packet at time T3. At this time, STA0 describes in the ACK Type portion of the data packet information indicating it desires that ACK should be returned by delay ACK (Del-ACK). At the same time, STA0 describes in the More Bit portion information indicating that more transmit data unit is stored. This data packet is received by STA1 without error.

Further, STA0 judges whether STA0 can complete transmission within the period indicated in the Duration field in the CTS, transmitted by STA1 at time T2, if STA0 continuously transmits data packets, starting at time T4. In the example illustrated in the figure, STA0 judges that, if it transmits the next data packet, it can complete data transmission within the period indicated in the Duration field in the CTS. Then, STA0 further transmits a stored data unit directed to STA1 at time T4. At this time, STA0 describes in the ACK Type portion of the data packet information indicating it desires that ACK should be returned by immediate ACK (Im-ACK). At the same time, STA0 describes in the More Bit portion information indicating a transmit data unit is not stored any more. This data packet is received by STA1 without error.

When STA1 receives the data packet, it recognizes that it is desired to immediately transmit an ACK, from the ACK Type portion in the DATA SMH. Then, STA1 returns an immediate ACK (Im-ACK) packet corresponding to the relevant data flow at time T5.

In this example of application, the Duration field in each packet is set so that it indicates the time period until the time indicated by arcuate arrow in FIG. 8.

E-5. Fifth Example of Application

Figure 9:
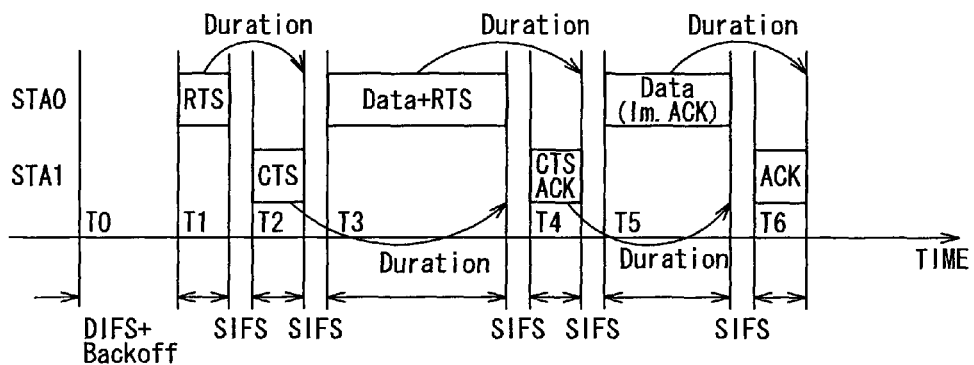
FIG. 9 is a drawing illustrating another example of the application of transmitting and receiving procedures according to the present invention.

FIG. 9 illustrates the fifth example of application of transmitting and receiving procedures in a wireless communication system according to the present invention. The figure also illustrates an example in which two data units are transmitted from STA0 to STA1. In this example, the number of data units which can be transmitted in one packet is limited to one. With respect to both the data units, immediate ACK is specified, and the transmitter station is permitted to continuously transmit packets.

STA0 starts the procedure for transmitting data units at time T0, and starts backoff count in accordance with the CSMA procedure for acquiring transmission right. The backoff count is completed at T1, and it is confirmed that the medium is clear during this period. Therefore, STA0 transmits a packet containing RTS information.

After STA1 receives the RTS directed to itself, it returns a packet containing CTS information at time T2 based on the information described in the RTS SMH.

After STA0 receives the CTS directed to itself, it transmits a data packet at time T3. At this time, STA0 describes in the ACK Type portion of the data packet information indicating it desires that ACK should be returned by immediate ACK. At the same time, STA0 describes in the More Bit portion information that more transmit data unit is stored. Further, STA0 adds RTS information for transmitting another data unit. That is, STA0 transmits a data packet with the RTS multiplexed. This data packet is received by STA1 without error.

STA1 recognizes that the data packet contains RTS information, and then tries to transmit a packet containing CTS information. At this time, STA1 refers to RTS Sequence and RTS Received MAP, and thereby recognizes that STA0 has not recognized the acknowledgement of the data unit previously received. Then, STA1 decides to include ACK information in the packet containing CTS information. Further, STA1 generates a receive data unit candidate list based on the information described in the RTS SMH. At this time, STA1 deletes the already received packet from the receive data unit candidate list to update the list, and then generates CTS information. Further, as ACK information, STA1 describes the ACK information corresponding to the data flow specified by the received RTS information. Thus, STA1 returns a packet containing ACK information and CTS information (i.e. a CTS packet with an ACK multiplexed) at time T4.

After STA0 receives the packet containing ACK information and CTS information, it tries to transmit a data unit based on the CTS information. Based on the ACK information, STA0 deletes the data unit already received by STA1 from the transmit data unit candidate list it holds. Then, STA0 generates a new transmit data unit candidate list, and determines a transmit data unit based on this new list. At this time, STA0 describes in the ACK Type portion of the data packet information indicating it desires that ACK should be returned by immediate ACK. At the same time, STA0 describes in the More Bit portion information indicating that a data unit to be transmitted is not present any more. STA0 transmits the thus generated data packet at time T5.

When STA1 receives the data packet with ACK information multiplexed, it recognizes that it is desired to immediately transmit an ACK, and returns a corresponding ACK information packet at time T6.

In this example of application, the Duration field in each packet is set so that it indicates the time period until the time indicated by arcuate arrow in FIG. 9. As the Duration value of the packet transmitted at time T6, zero indicating NULL is placed.

E-6. Sixth Example of Application

Figure 10:
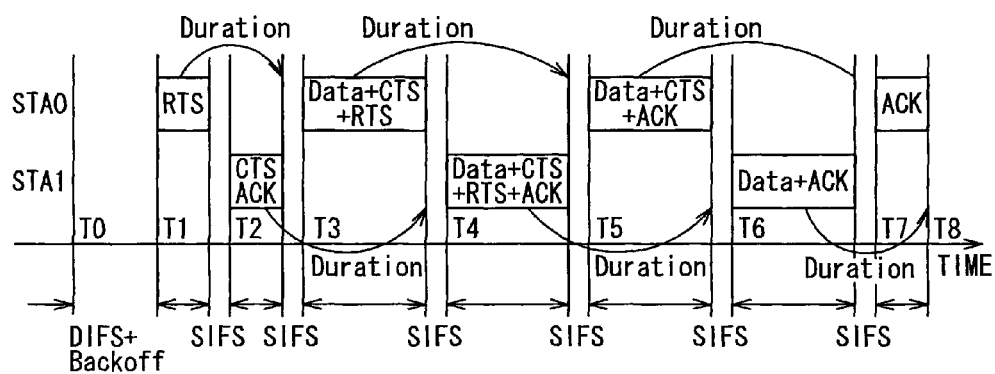
FIG. 10 is a drawing illustrating a further example of the application of transmitting and receiving procedures according to the present invention.

FIG. 10 illustrates the sixth example of application of transmitting and receiving procedures in a wireless communication system according to the present invention. This figure illustrates an example of two-way communication wherein two data units are transmitted from STA0 to STA1 and simultaneously two data units are transmitted from STA1 to STA0. In this example, the number of data units which can be transmitted in one packet is limited to one, and it is permitted to multiplex RTS into CTS.

STA0 starts the procedure for transmitting data units at time T0, and starts backoff count in accordance with the CSMA procedure for acquiring transmission right. The backoff count is completed at T1, and it is confirmed that the medium is clear during this period. Therefore, STA0 transmits a packet containing RTS information. In the RTS/CTS Mux portion in the RTS SMH, information is set which indicates that RTS may be multiplexed into CTS.

After STA1 receives the RTS information, it returns a packet containing CTS information at time T2 based on the information described in the RTS SMH. At this time, STA1 recognizes from the RTS/CTS Mux portion in the RTS SMH that RTS may be multiplexed into CTS, and it holds data units directed to STA0. Therefore, STA1 generates RTS information for transmitting these data units to STA0. As a result, a packet containing CTS information and RTS information (i.e. a CTS packet with an RTS multiplexed) is transmitted.

After STA0 receives the packet containing CTS information and RTS information, it tries to transmit a data unit at time T3 based on the CTS information. At this time, STA0 describes in the ACK Type portion of the data packet information indicating it desires that ACK should be returned by immediate ACK. At the same time, STA0 describes in the More Bit portion information indicating that more transmit data unit is stored. Further, STA0 adds RTS information for transmitting another data unit. Since RTS information is also contained in the receive packet, STA0 generates CTS information in response thereto, and adds the CTS information.

As a result, a packet in which data, the RTS information, and the CTS information are multiplexed is transmitted from STA0 at time T3. (That is, a data packet in which CTS in response to RTS from STA1 and RTS for transmitting the subsequent data unit are multiplexed is transmitted.) This data packet is received by STA1 without error.

STA1 receives the packet with the data, RTS information, and CTS information multiplexed, and recognizes that this packet contains RTS information. Then, STA1 tries to transmit a packet containing CTS information. At this time, STA1 refers to RTS Sequence and RTS Received MAP, and thereby recognizes that STA0 has not recognized the acknowledgement of the data unit previously received. Thus, STA1 decides to include ACK information in the packet containing CTS information. Further, STA1 generates a receive data unit candidate list based on the information described in the RTS SMH. At this time, STA1 deletes the already received packet from the receive data unit candidate list to update the list, and then generates CTS information. Further, as ACK information, STA1 describes the ACK information corresponding to the data flow specified by the received RTS information. Further, STA1 recognizes that the packet contains CTS information, and transmits a data unit as well based on the CTS information. STA1 describes in the ACK Type portion in the DATA SMH information indicating it desires that ACK should be returned by immediate ACK. At the same time, STA1 describes in the More Bit portion information indicating that more transmit data unit is stored. Further, STA1 adds RTS information for transmitting another data unit.

Thus, STA1 returns a packet containing ACK information, CTS information, a data unit, and RTS information at time T4. That is, STA1 multiplexes and transmits the following: a data packet in response to the reception of CTS from STA0; a CTS in response to an RTS from STA0; an RTS for transmitting the subsequent data unit; and an ACK corresponding to the reception of a data unit from STA0.

STA0 receives the packet containing ACK information, CTS information, a data unit, and RTS information, and tries to transmit a data unit based on the CTS information. Based on the ACK information in the received packet, STA0 deletes the data unit already received by STA1 from the transmit data unit candidate list it holds. Then, STA0 generates a new transmit data unit candidate list, and determines a transmit data unit based on this new list. At this time, STA0 describes in the ACK Type portion of the data packet information indicating it desires that ACK should be returned by immediate ACK. At the same time, STA0 describes in the More Bit portion information indicating that a data unit to be transmitted is not present any more. Further, since STA0 extracted the new data unit from the received packet without error, it decides to return ACK information. Further, since the received packet contains RTS information as well, STA0 generates CTS information corresponding thereto, and also decides to transmit the CTS information. The generating procedure for CTS information is the same as described above; therefore, its description will be omitted here.

Thus, STA0 returns the packet containing a data unit, ACK information, and CTS information at time T5. That is, STA0 multiplexes and transmits the following: a data unit in response to a CTS from STA1; a CTS in response to an RTS from STA1; and an ACK corresponding to a data unit received form STA1.

When STA1 receives the packet containing a data unit, ACK information, and CTS information, it extracts the data unit, and decides to transmit ACK information corresponding thereto. Further, when STA1 recognizes that the packet contains CTS information and ACK information, it updates the transmit data unit candidate list based on the ACK information. Then, STA1 decides to transmit a data unit as well based on the CTS information. Thus, STA1 returns a packet containing ACK information and a data unit (i.e. a data packet with the ACK of the data unit received from STA0 multiplexed) at time T6.

After STA0 receives the packet containing ACK information and a data unit, it refers to the ACK Type portion in the DATA SMH, and thereby recognizes that it is desired to immediately transmit an ACK. Then, STA0 returns a corresponding ACK information packet at time T7.

In the above example, the Duration field in each packet is set so that it indicates the time period until the time indicated by arcuate arrow in FIG. 10. Since the data length is determined beforehand when CTS information is generated, each Duration value can be set.

Whether RTS information or ACK information is multiplexed in a returned packet is unknown; therefore, Duration cannot be exactly specified sometimes. In preparation for such a case, a slightly larger value allowing a margin is set for the Duration value sometimes.

Further, there are cases where a Duration value is set on the assumption that RTS information or ACK information is not multiplexed and an actual packet is transmitted over a period slightly longer than the Duration value. Since the length of this information is not so large, however, great loss will not result. As the Duration value of the packet transmitted at time T8, zero indicating NULL is placed.

In the above-mentioned embodiments E-1 to E-6, it is judged whether to set "information indicating RTS may be multiplexed into CTS" in the RTS/CTS Mux portion in the RTS SMH. This judgment can also be made based on the history of communication between RTS transmitting station and station as its destination, or the packets received from the station as the destination of the relevant RTS in the past. Referring to the relevant drawings, description will be given below to some examples in which control is carried out in accordance with whether the station as the destination of RTS holds data it desires to transmit to the RTS transmitting station or not.

In the example illustrated in FIG. 24, STA1 transmits RTS (P0), STA0 returns CTS (P1), STA1 transmits DATA (P2), and STA0 returns ACK (P3).

Here, it is assumed that, in the More Bit portion in the DATA SMH of the packet P2 containing DATA, it is described that STA1 still holds data directed to STA0.

STA0 holds the information in the More Bit portion of data most recently received from STA1, and can thereby recognize that STA1 holds data STA1 desires to transmit to STA0.

If STA0 recognizes that STA1 holds data directed to STA0 when STA0 transmits an RTS to STA1, it sets in the RTS/CTS Mux portion in the RTS SMH "information indicating that RTS may be multiplexed into CTS."

FIG. 24 illustrates a case where this RTS is transmitted as P4. In response thereto, STA1 returns a packet containing CTS and RTS SMH related to its own data transmission, that is, a packet (P5) wherein a CTS is multiplexed into an RTS. Then, STA0 transmits a packet containing data in response to the received CTS SMH and a CTS SMH corresponding to the received RTS SMH, that is, a packet (P6) where in data and CTS are multiplexed. Subsequently, STA1 transmits a packet containing ACK SMH corresponding to the received data and data corresponding to the received CTS SMH, that is, a packet (P7) wherein data and ACK are multiplexed. Further, STA0 transmits a packet (P8) containing ACK SMH corresponding to the received data.

In the example illustrated in FIG. 25, as in the example illustrated in FIG. 24, STA1 transmits RTS (P0), STA0 returns CTS (P1), STA1 transmits DATA (P2), and STA0 returns ACK (P3).

Here, it is assumed that, in the More Bit portion in the DATA SMH of the packet P2 containing DATA, it is described that STA1 still holds data directed to STA0.

STA0 holds the information in the More Bit portion of data most recently received from STA1, and can thereby recognize that STA1 holds data STA1 desires to transmit to STA0.

In this case, the following can occur even if data directed to STA1 is not present in STA0: because STA1 holds data STA1 desires to transmit to STA0, STA0 transmits an RTS wherein "information indicating that RTS may be multiplexed into CTS" is set in the RTS/CTS Mux portion in the RTS SMH. At this time, STA0 writes in the other fields in the RTS SMH information indicating that STA0 has no data to transmit.

This RTS is a dummy RTS which is different from the RTS proper which requests data transmission of the destination of data transmission. Other surrounding stations than STA1 receive this dummy RTS, and thereby set an NAV and refrain from transmission only for the Duration described in the RTS. Since the other surrounding stations refrain from transmission, it is easier for STA1 to transmit RTS for transmitting the subsequent data unit. That is, STA0 transmits a dummy RTS, and can thereby make it easier for STA1 to acquire RTS transmission right. As a result, STA0 can efficiently receive the subsequent data unit from STA1.

FIG. 25 illustrates a case where this dummy RTS is transmitted as P4. In response thereto, STA1 performs the operation of transmitting the subsequent data unit in accordance with the ordinary RTS/CTS procedure. Specifically, STA1 returns a packet (P5) containing RTS SMH related to its own data transmission, and STA0 transmits a packet (P6) containing CTS SMH corresponding to the received RTS SMH. STA1 transmits a packet (P7) containing data corresponding to the received CTS SMH, and STA0 transmits a packet (P8) containing ACK SMH corresponding to the received data.

In the example illustrated in FIG. 26, STA1 transmits RTS (P0) to STA0, and STA0 can receive it without error. However, a problem arises. During this period of time, STA0 interpreted the Duration field in a packet transmitted from another station (hidden terminal (not shown) for STA1), and thereby has set an NAV. Therefore, STA0 cannot return a CTS. STA0 receives the RTS packet (P0), and thereby recognizes that STA1 holds data STA1 desires to transmit STA0.

In the example illustrated in FIG. 25, STA1 sets More bit, and thereby STA0 recognizes that STA1 has the subsequent data unit. The example illustrated in FIG. 26 is different in that:

STA0 receives an RTS from STA1 and thereby recognizes that STA1 has the subsequent data unit. In the latter, STA0 sets an NAV and thus cannot return a CTS. Therefore, though STA1 has the subsequent data unit, its data transmission operation is stopped.

In this case, the following can occur even if data directed to STA1 is not present in STA0: because STA1 holds data STA1 desires to transmit to STA0, STA0 transmits an RTS wherein "information indicating that RTS may be multiplexed into CTS" is set in the RTS/CTS Mux portion in the RTS SMH. At this time, STA0 writes in the other fields in the RTS SMH information indicating that STA0 has no data to transmit. (If data directed to STA1 is present in STA0, the same operation takes place though this is not shown in the figure. That is, STA0 transmits an RTS wherein "information indicating that RTS may be multiplexed into CTS" is set in the RTS/CTS Mux portion in the RTS SMH.)

This RTS is a dummy RTS which is different from the RTS proper. When other surrounding stations than STA1 receive this dummy RTS, they set an NAV and refrain from transmission. Since the other surrounding station refrain from transmission, it is easier for STA1 to transmit RTS for transmitting the subsequent data unit. That is, STA0 transmits a dummy RTS, and can thereby make it easier for STA1 to acquire RTS transmission right. As a result, STA0 can efficiently receive the subsequent data unit from STA1 (same as above).

FIG. 26 illustrates a case where this RTS is transmitted as P4. In response thereto, STA1 performs the operation of transmitting the subsequent data unit in accordance with the ordinary RTS/CTS procedure. Specifically, STA1 returns a packet (P5) containing RTS SMH related to its own data transmission, and STA0 transmits a packet (P6) containing CTS SMH corresponding to the received RTS SMH. STA1 transmits a packet (P7) containing data corresponding to the received CTS SMH, and STA0 transmits a packet (P8) containing ACK SMH corresponding to the received data.

As an example of utilization different from the foregoing, "information indicating that RTS may be multiplexed into CTS" may be always set in the RTS/CTS Mux portion in the RTS SMH.

F. Procedure for Acknowledgement of Sequence Number

Figure 11:
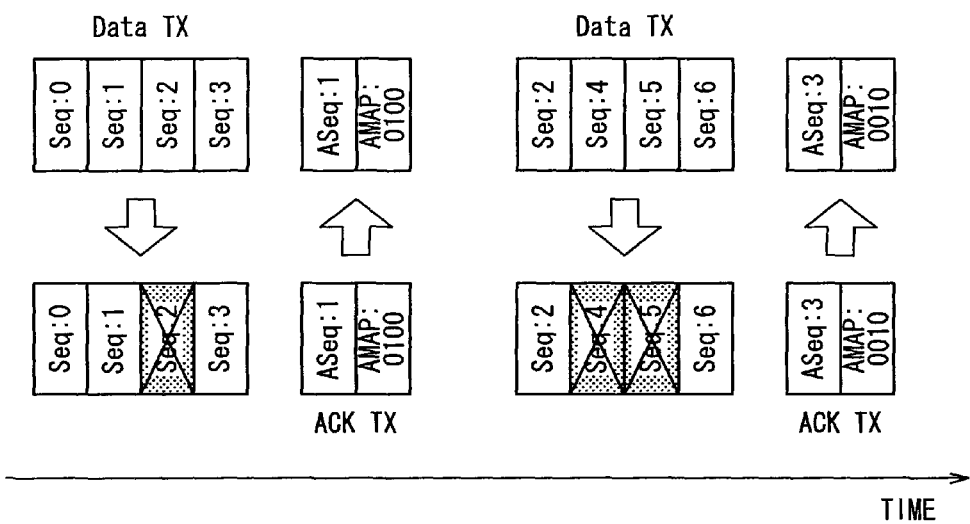
FIG. 11 is a drawing illustrating the acknowledgement procedure related to data other than data flow 0 assumed in the present invention.

FIG. 11 illustrates the acknowledgement procedure related to data other than data flow 0 assumed in the present invention. The figure shows a concrete example of the interaction of individual fields which occurs when selective acknowledgement is carried out. The example is on the assumption that the Received MAP field is constituted of four bits for the purpose of simplifying the explanation; however, the present invention is not limited to this constitution.

The data transmitting end transmits data units of sequence numbers "0," "1," "2," and "3" from the transmit data unit candidate list. It is assumed that the data unit #2 is received with an error therein.

In the ACK Sequence field in the acknowledgement ACK returned by the data receiving end, "1," which indicates that the data units of up to #1 could be completely received, is placed. With the data unit #2 which is the data unit subsequent to #1 taken as the basis (as MSB), "0100" is placed in the Received MAP field. "0100" indicates the following: the reception of the data unit #2 failed (0); that of the data unit #3 succeeded (1); that of the data unit #4 failed (0); and that of the data unit #5 also failed (0).

When the data transmitting end receives this, it recognizes that the data units of up to #1 were received and the data unit #3 was also received. In the next data transmission, the data transmitting end deletes them from the transmit data unit candidate list, and transmits the data units of sequence numbers "2," "4," "5," and "6." It is assumed that the data units #4 and #5 are received with an error therein.

In the ACK Sequence field in the acknowledgement ACK returned by the data receiving end, "3," which indicates that the data units of up to #3 could be completely received, is placed. With the data unit #4 which is the data unit subsequent to #3 taken as the basis (as MSB), "0010" is placed in the Received MAP field. "0010" indicates the following: the reception of the data unit #4 failed (0); that of the data unit #5 also failed (0); that of the data unit #6 succeeded (1); and that of the data unit #7 failed (0).

Thus, the ACK Sequence field and the Received MAP are used together, and thereby ARQ (Automatic Repeat reQuest) is carried out. If the data transmitting end does not support selective acknowledgement, the following procedure is taken: when it receives an ACK and updates the transmit data unit candidate list, it disregards Received MAP. If the data receiving end does not support selective acknowledgement, the following procedure is taken: it does not try to decode the data unit with an error therein and the subsequent pieces of data for linkage with the ACK Sequence field, and places zero in all the bits of the Received MAP field. Thus, even if communication is carried out between a communication station which supports selective acknowledgement and a communication station which does not, the communication can be maintained without failure.

Figure 12:
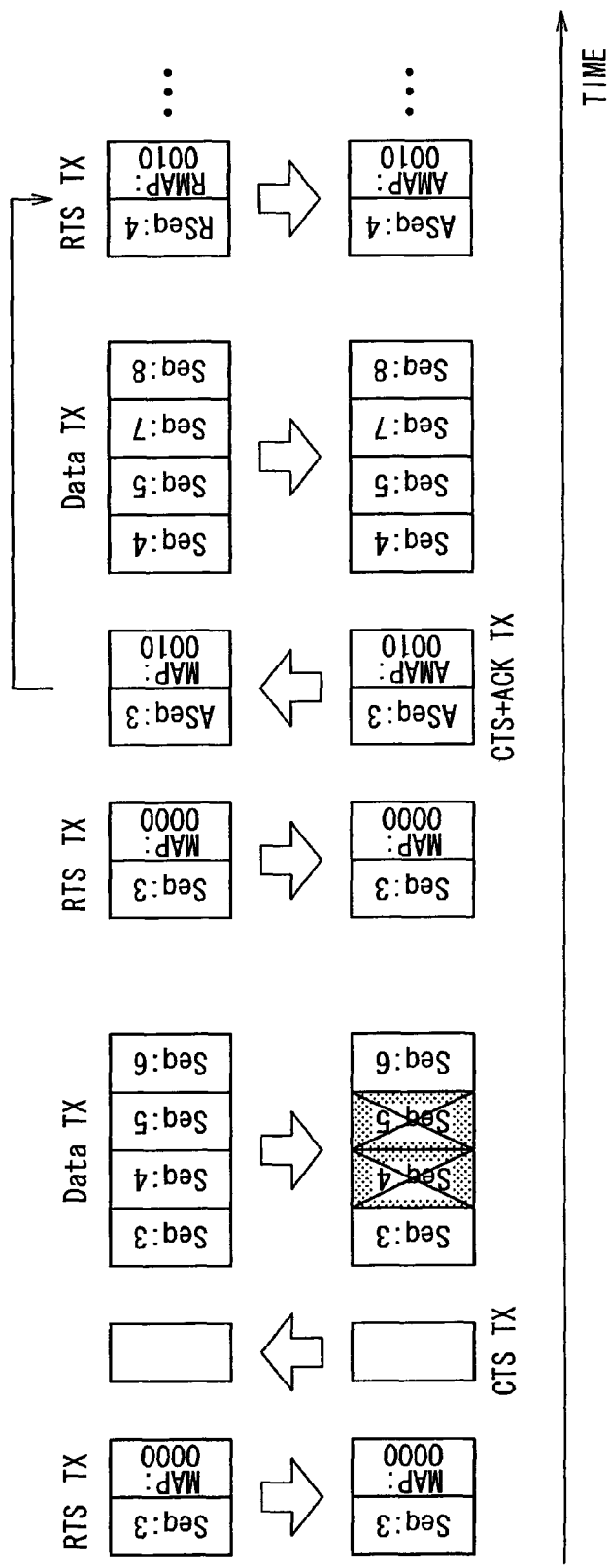
FIG. 12 is a drawing illustrating a concrete example of the interaction of individual fields which occurs when selective acknowledgement is carried out with RTS/CTS used together.

G. Procedure for Acknowledgement of Sequence Number with RTS/CTS Procedure Used Together FIG. 12 illustrates another concrete example of the interaction of individual fields which occurs when selective acknowledgement is carried out with RTS/CTS used together. Here, to give description with attention focused only on the portions related to the sequence number and the Received MAP, other fields will not be mentioned. However, in reality, procedures using other fields, which are described elsewhere, are also carried out. The example is on the assumption that the Received MAP field is constituted of four bits for the purpose of simplifying the explanation; however, the present invention is not limited to this constitution. With respect to RTS SMH, this example is on the assumption that the first or fourth example of constitution is adopted.

The data transmitting end transmits an RTS which indicates that the data units of sequence numbers "3," "4," "5" "6"..., are entered in the transmit data unit candidate list. At this time, in the RTS Sequence field in the RTS SMH, "3" is placed which indicates the leading data unit, and in the RTS Received MAP field, "0000" is placed which indicates that all the data units #4 to #7 are transmit candidates.

Since all the data units indicated by the RTS have not received yet, the data receiving end does not return an ACK but returns a CTS and waits for incoming data units.

It is assumed that the data units #4 and #5 are received with an error therein. Further, it is assumed that delay ACK is specified for these data. Because of delay ACK, the receiving end does not immediately return an ACK.

To further transmit data, the data transmitting end transmits an RTS again which indicates that the data units #3, #4, #5, #6, . . . are entered in the transmit data unit candidate list. Similarly with the foregoing, in the RTS Sequence field in the RTS SMH, "3" is placed which indicates the leading data unit, and in the RTS Received MAP, "0000" is placed which indicates that all the data units #4 to #7 are transmit candidates.

Since some of the data units indicated by the RTS have been already received, the data receiving end adds ACK information when it returns a CTS. At this time, "3" is placed in the ACK SEQUENCE field in the ACK SMH, indicating that the data units of up to #3 could be completely received. With the data unit #4 which is the data unit subsequent to "3" taken as the basis (as MSB), "0010" is placed in the Received MAP field. "0010" indicates the following: the reception of the data unit #4 failed (0); that of the data unit #5 also failed (0); that of the data unit #6 succeeded (1); and that of the data unit #7 is failed (0).

When the data transmitting end receives this, it recognizes that the data units of up to #3 were received and the data unit #6 was also received. In the next data transmission, the data transmitting end deletes them from the transmit data unit candidate list, and further transmits the data units of sequence numbers "4," "5," "7," and "8" based on the CTS information.

Thus, the RTS Sequence field and the RTS Received MAP field are used, and further multiplexing of the CTS SMH and the ACK SMH is used together. Thereby, data can be transmitted and received without failure.

If the data transmitting end does not support selective acknowledgement, the following procedure can be taken: the transmitting end always places zero in all the bits of the RTS Received MAP field, and, when it receives an ACK and updates the transmit data unit candidate list, it disregards the Received MAP. If the data receiving end does not support selective acknowledgement, it can disregard the RTS Received MAP. Thus, even if communication is carried out between a communication station which supports selective acknowledgement and a communication station which does not, the communication can be maintained without failure.

Figure 13:
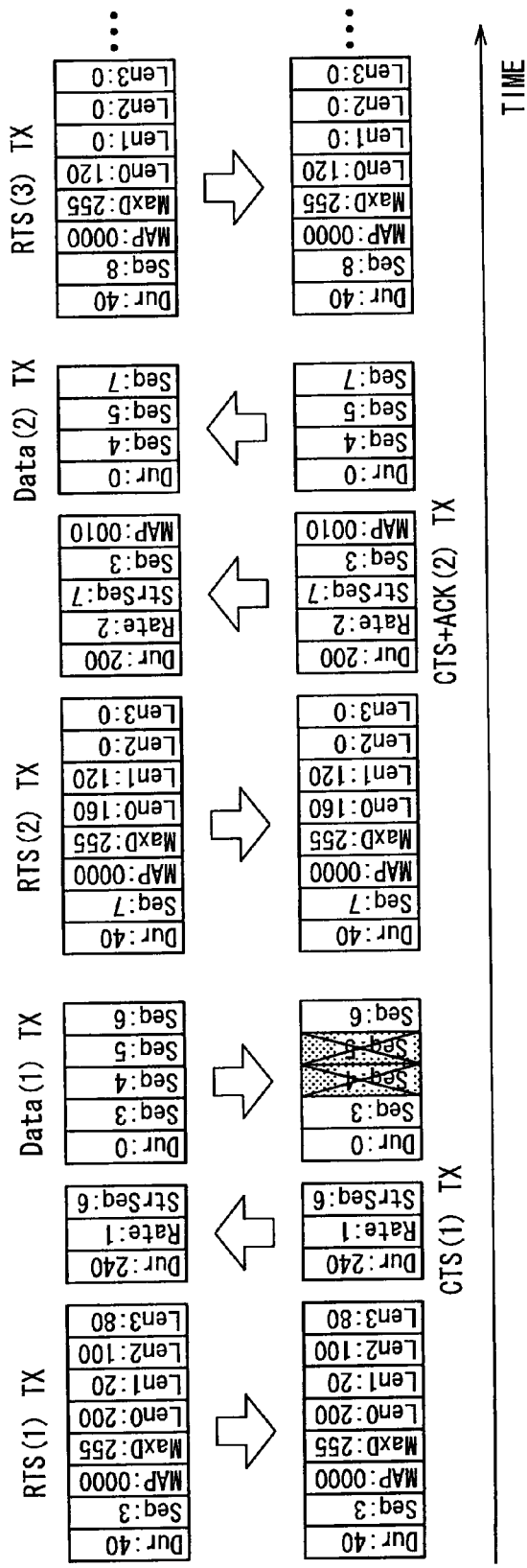
FIG. 13 is a drawing illustrating an example of data transmitting and receiving procedures taken when delay ACK and the RTS/CTS procedure are applied.

H. Utilization of CTS Stored Sequence and Uses of Fields with RTS/CTS Procedure Used Together FIG. 13 illustrates an example of data transmitting and receiving procedures wherein delay ACK and the RTS/CTS procedure are applied. This section gives description with attention focused on the handling of each sequence number and the use of the Stored Sequence field in the CTS SMH.

The example is on the assumption that the RTS Received MAP and Received MAP fields are both constituted of four bits for the purpose of simplifying the explanation; however, the subject matter of the present invention is not limited to this constitution. Further, it is assumed that the number of the Length fields in the RTS SMH is four, but the subject matter of the present invention is not limited to this. Some value is indicated in the Duration field; however, no notice will be taken of the correctness of the value by Duration here. With respect to RTS SMH, this example is also on the assumption that the first or fourth example of constitution is adopted.

Prior to data transmission, the data transmitting end transmits RTS(1). It indicates that the data units of sequence numbers "3," "4," "5," and "6" are entered in the transmit data unit candidate list at this time. (That is, "3" is placed in the RTS Sequence field, and "0000" is placed in the RTS Received MAP field. Further, the data transmitting end notifies that it desires that this data transmission should be completed in 255-unit time on the grounds of the data transmitting end. (That is, "255" is placed in the Max Duration field.) Further, the data transmitting end notifies that the lengths of the data units it is about to transmit are 200, 20, 100, and 80 unit bytes, respectively. (That is, "200" is placed in Length0; "20" is placed in Length1; "100" is placed in Length2; and "80" is placed in Length3.) The time that lapses before the transmission of a CTS transmitted in response to this RTS is completed is set to 40-unit time, and "40" is written in the Duration field.

After receiving this, the data receiving end returns CTS(1). At this time, it determines rate class 1 as the transmission rate for data reception in accordance with the above-mentioned procedure, and notifies of this. (That is, "1" is placed in RATE). Further, the data receiving end determines that it receives the data units #3, #4, #5, and #6 in accordance with the above-mentioned procedure, and notifies that the time period required for completing the reception of them is 240-unit time. (That is, "240" is placed in Duration.) Further, the data receiving end holds the lengths of the data units of up to #6 which it determined to receive in this transaction. Then, it notifies that it has held information on the lengths of the data units of up to #6. (That is, "6" is placed in Stored Sequence.)

After receiving this, the data transmitting end transmits Data(1). At this time, it recognizes that it can transmit the data units #3, #4, #5, and #6 at the specified transmission rate class 1, in accordance with the above-mentioned procedure. Then, it transmits these information at transmission rate class 1. Since delay ACK is specified, "0" is placed in the Duration field. Further, the data transmitting end holds sequence number 6 reported by the Stored Sequence in the CTS so that it can refer to the number when it transmits an RTS next time.

It is assumed that the data receiving end can extract only the data units of sequence numbers "3" and "6." However, the data transmitting end cannot confirm whether data reception succeeded or not, at this point of time.

To further transmit data units, the data transmitting end transmits RTS(2). At this time, the data units of sequence numbers "3," "4," "5," "6," . . . are entered in the transmit data unit candidate list. When CTS(1) was received before, it was reported by Stored Sequence that "the lengths of the data units of up to sequence number 6 are held." Therefore, information is described which is related to the data units of higher sequence numbers than 6 in the transmit data unit candidate list. More specifically, the data transmitting end notifies that the data units of sequence numbers "7" and "8" are entered and also notifies of their lengths. (That is, "7" is placed in the RTS Sequence field; "0000" is placed in RTS Received MAP; "160" is placed in Length0; "120" is placed in Length1; "00" is placed in Length2; and "0" is placed in Length3.) That Length2 and Length3 are 0 notifies that transmit data candidates are only two data units with lengths of 160 and 120. Further, the data transmitting end notifies that it desires that this data transmission should be completed in 255-unit time on the grounds of the data transmitting end. (That is, "255" is placed in the Max Duration field.) Further, the time that lapses before the transmission of a CTS transmitted in response to this RTS is completed is set to 40-unit time, and "40" is written in the Duration field.

After receiving this, the data receiving end returns CTS(2). At this time, it notifies that it determined rate class 2 as the transmission rate for data reception, in accordance with the above-mentioned procedure. (That is, "2" is placed in RATE in CTS SMH.) Further, the data receiving end determines that it receives the data units of sequence numbers "4," "5," and "7" in accordance with the above-mentioned procedure, and notifies that the time period required for completing the reception of them is 200-unit time. (That is, "200" is placed in Duration.) Further, the data receiving end holds the lengths of the data units of up to #7 which it determined to receive in this transaction. Then, it notifies that it has held information on the lengths of the data units of up to #7. (That is, "7" is placed in Stored Sequence in CTS SMH.) Further, the data receiving end determines to return ACK information as well, in accordance with the above-mentioned procedure, and notifies that it could completely receive the data units of up to #3 and could receive the data unit #6. (That is, "3" is placed in ACK Sequence in ACK SMH, and "0010" is placed in Received MAP.)

After receiving this, the data transmitting end transmits Data(2). Since ACK information is included, at this time, it updates the transmit data unit candidate list in accordance with the above-mentioned procedure. Thereafter, the data transmitting end recognizes that it can transmit the data units #4, #5, and #7 at the specified transmission rate class 2, and transmits them. Further, since delay ACK is specified, "0" is placed in the Duration field. Further, the data transmitting end holds sequence number "7" reported by the Stored Sequence in the CTS so that it can refer to the number when it transmits an RTS next time.

To further transmit data units, the data transmitting end transmits RTS(3). At this time, it describes information related to the data units of higher sequence numbers than 7, which is the Stored Sequence held when CTS(2) was received, in the transmit data unit candidate list. More specifically, the data transmitting end notifies that the data unit of sequence number "8" is entered and also notifies of its length. (That is, "8" is placed in RTS Sequence; "0000" is placed in RTS Received MAP; "120" is placed in Length0; "0" is placed in Length1; "0" is placed in Length2; and "0" is placed in Length3.) Further, the data transmitting end notifies that it desires that this data transmission should be completed in 255-unit time on the grounds of the data transmitting end. (That is, "255" is placed in Max Duration.) Further, the time that lapses before the transmission of a CTS transmitted in response to this RTS is set to 40-unit time, and "40" is written in Duration.

Thus, the transmitter and the receiver set the fields in the respective packet headers, and refer to each other's headers and thereby determine the details of processing as the outcome of receive packets. As a result, even if delay ACK is used together, Length information is prevented from being uselessly specified in RTS, and thus the efficiency is enhanced.

I. Transmitting and Receiving Procedures for Traffic through TCP

Figure 14:
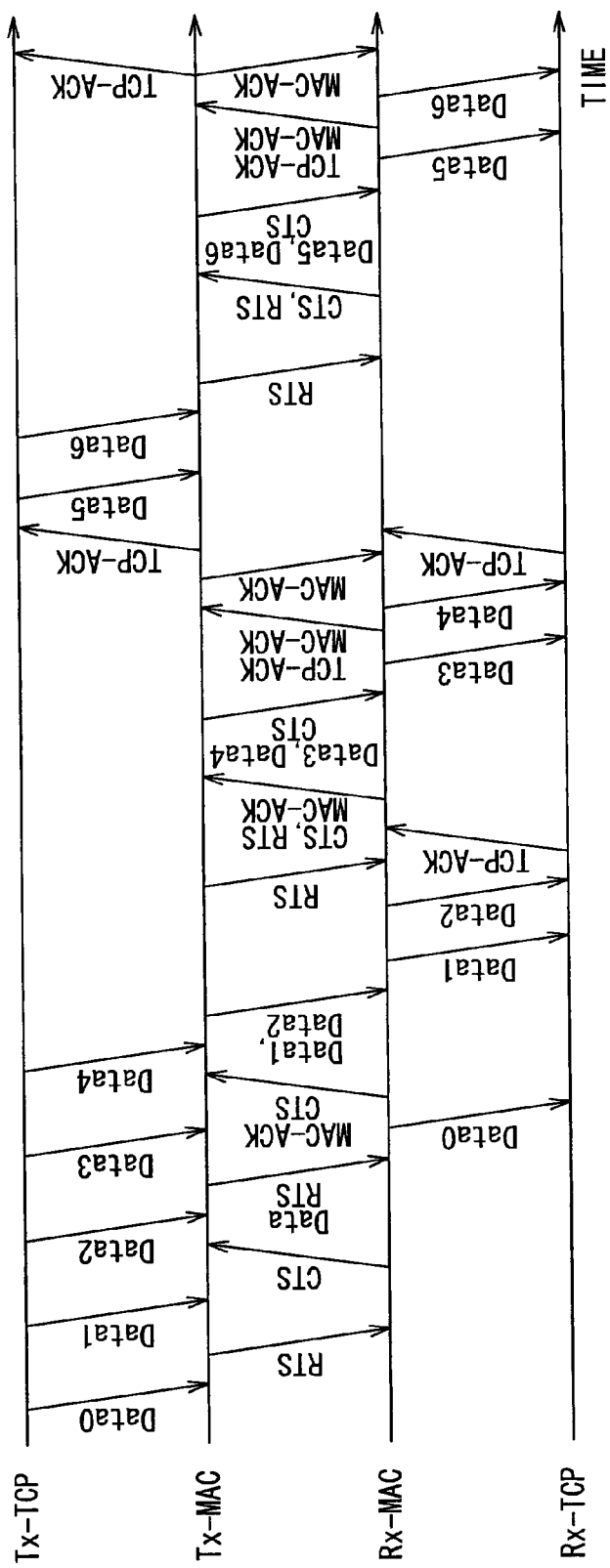
FIG. 14 is a drawing illustrating an example of the sequence in which traffic is transmitted and received through TCP/IP in accordance with the MAC procedure according to the present invention.

FIG. 14 illustrates an example of the sequence in which traffic is transmitted and received through TCP/IP in accordance with the MAC procedure according to the present invention. Even if communication is of one way in terms of application, ACK is returned by the TCP layer typically every two segments, and it is brought into the form of asymmetrical two-way communication in the MAC layer. The figure illustrates an example in which delay ACK is applied; multiplexing of such packets as RTS, CTS, DATA, and ACK is permitted; and these are used together.

Figure 20:
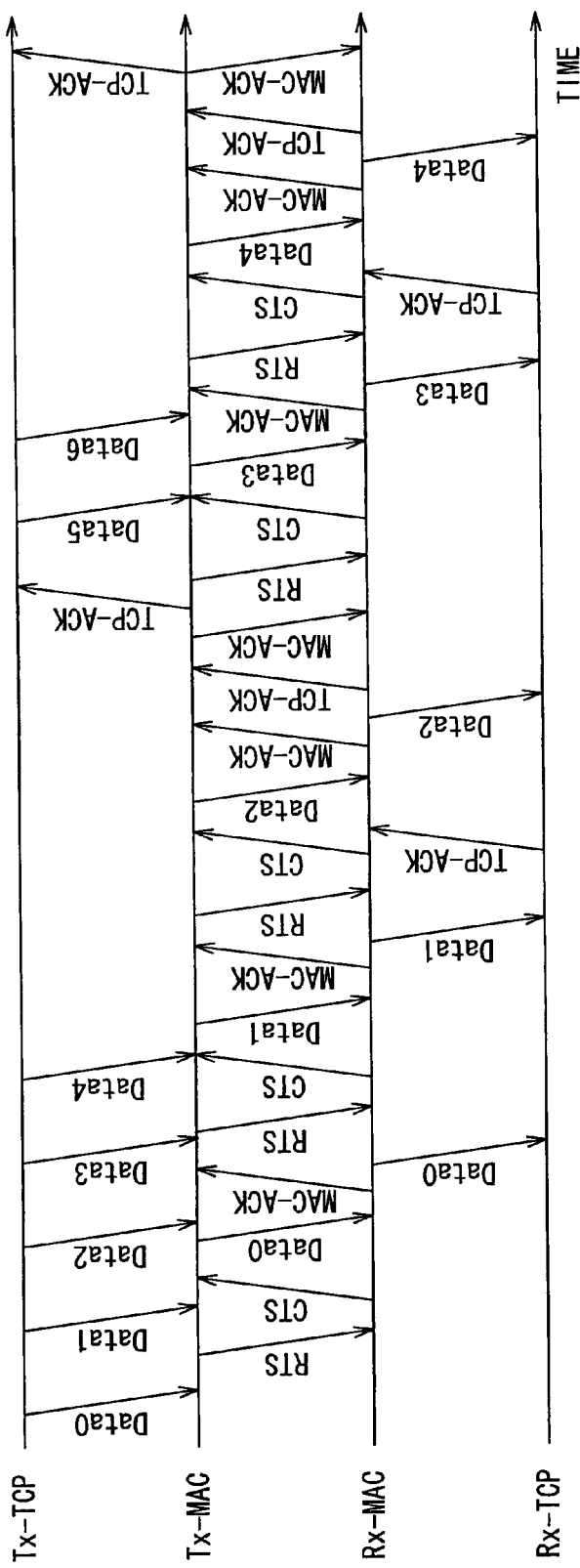
FIG. 20 is a drawing illustrating an example of the operation sequence in which packet transmission and reception transaction based on the RTS/CTS procedure according to IEEE802.11 is implemented with traffic through TCP/IP.

In conventional transmitting and receiving procedures through TCP, packets equivalent to 24 times in total are transmitted and received in the MAC layer to transmit five segments Data0 to Data4, as illustrated in FIG. 20. Thus, the processing is complicated and redundant.

In the transmitting and receiving procedures according to the present invention, packets equivalent to 15 times in total are transmitted and received in the MAC layer to transmit seven segments Data0 to Data6, as illustrated in FIG. 14.

As is obvious from the foregoing as well, it will be understood that, in the transmitting and receiving procedures according to the present invention, the process in the MAC layer is simplified, and its overheads can be significantly reduced.

Up to this point, the present invention has been described in details referring to the specific embodiments. However, it is obvious that those skilled in the art can make modifications to or substitutions for the embodiments without departing from the scope of the present invention.

In this specification, description has been given to the embodiments made by applying the present invention to a system wherein the RTS/CTS procedure and the access method based on CSMA are used together in a wireless network in accordance with the IEEE802.11 standard. However, the subject matter of the present invention is not limited to this. For example, the present invention can be similarly applied to the following systems: a system wherein the RTS/CTS procedure is used together with a random access method other than CSMA; and a random access system in accordance with other requirements than in IEEE802.11.

In short, this specification discloses the present invention in the form of exemplification, and the contents of this specification should not be interpreted in a restrictive manner. The scope of the present invention, therefore, is to be determined solely by the following claims.

What is claimed is:

1. A wireless communication system, comprising:

a data transmitting communication station that acquires, by processing circuitry, a transmission right on a medium and carries out an initial data communication with a data receiving communication station, wherein a data transmission included in the initial data communication from the data transmitting communication station indicates that subsequent data to be transmitted is present in the data transmitting communication station, in response to receiving the initial data communication including the data transmission indicating that the subsequent data is present, the data receiving communication station transmits a clear to send packet (CTS) onto the medium to eliminate the transmission right of other communication stations such that the subsequent data is permitted to be sent, and the data receiving communication station determines a transmission rate at which the subsequent data is to be received, the transmission rate being based on a reception quality of the initial data communication and a transmission rate class corresponding to a rate strategy field in the initial data communication.

2. The wireless communication system according to claim 1, wherein
each of the other communication stations confirms that the medium is clear only for a predetermined time period, waits for an arbitrary backoff time, and acquires the transmission right.

3. The wireless communication system according to claim 1, wherein medium access control is carried out concurrently by each of the other communication stations using a RTS/CTS, and
the initial data communication includes a request to send packet (RTS).

4. The wireless communication system according to claim 1, wherein a presence or absence of an indication, in the initial data communication, that the data transmitting communication station has the subsequent data is detected based on a history of communication between the data transmitting communication station and the data receiving communication station.

5. The wireless communication system according to claim 1, wherein
a presence or absence of an indication, in the initial data communication, that the data transmitting communication station has the subsequent data is detected based on a request to send packet (RTS) from the data transmitting communication station reaching the data receiving communication station, and the data receiving communication station returning the CTS when data transmission from the data transmitting communication station is not started, or when the subsequent data does not reach the data receiving communication station.

6. The wireless communication system according to claim 1, wherein
a presence or absence of an indication, in the initial data communication, that the data transmitting communication station has the subsequent data is detected based on specified information elements indicating the presence or absence of the indication of the subsequent data contained in data transmitted from the data transmitting communication station.

7. The wireless communication system according to claim 1, wherein the subsequent data is sent from the data transmitting communication station to the data receiving communication station following receipt at the data transmitting communication station of the CTS.

8. The wireless communication system according to claim 1, wherein in response to receiving the CTS from the data receiving communication station, medium access control is carried out by the data transmission communication station using a RTS/CTS method in which the data transmission communication station transmits another data communication including a second request to send packet (RTS), the initial data communication including a first RTS, and starts transmission of the subsequent data.

9. A wireless communication device that operates in a communication environment in which each communication station acquires a transmission right on a medium before carrying out data communication, comprising:
circuitry configured to:
transmit and receive data on said medium;
process transmitted and received data; and
control an access operation on the medium, wherein after an initial data transmission from a data transmitting communication station is stopped, detecting an indication that subsequent data in the data transmitting communication station is present or absent, the indication being included in the initial data transmission, and
in response to detecting the indication that the subsequent data is present, transmitting a clear to send packet (CTS) onto the medium to eliminate the transmission right of other communication stations such that the subsequent data is permitted to be sent, and
the data receiving communication station determines a transmission rate at which the subsequent data is to be received, the transmission rate being based on a reception quality of the initial data transmission and a transmission rate class corresponding to a rate strategy field in the initial data transmission.

10. The wireless communication device according to claim 9,
wherein the circuitry is further configured to wait for an arbitrary backoff time and acquire the transmission right.

11. The wireless communication device according to claim 9,
wherein the circuitry is further configured to concurrently carry out out medium access control using a RTS/CTS method, and
the initial data transmission includes a request to send packet (RTS).

12. The wireless communication device according to claim 9,
wherein the circuitry is further configured to detect whether the indication of the subsequent data in the data transmitting communication station is present or absent based on a history of communication with the data transmitting communication station.

13. The wireless communication device according to claim 9,
wherein the circuitry is further configured to detect whether the indication of the subsequent data in the data transmitting communication station is present or absent based on whether a transmission of transmit data from the data transmitting communication station is stopped after the CTS was returned in response to a request to send (RTS), included in the initial data transmission, from the data transmitting communication station.

14. The wireless communication device according to claim 9,
wherein the circuitry is further configured to detect whether the indication of the subsequent data in the data transmitting communication station is present or absent based on specified information elements indicating the presence or absence of the subsequent data contained in data transmitted from the data transmitting communication station.

15. A wireless communication method in a communication environment in which each communication station acquires a transmission right on a medium before carrying out data communication, comprising:
detecting, by data receiving communication station circuitry, an indication of a presence or absence of subsequent transmit data from another communication station in an initial data transmission; and
in response to detecting the indication of the presence of the subsequent transmit data from the another communication station, transmitting, by the data receiving communication station circuitry, a clear to send packet (CTS) onto the medium to eliminate the transmission right of other communication stations such that the subsequent data is permitted to be sent,
the data receiving communication station circuitry determines a transmission rate at which the subsequent data is to be received, the transmission rate being based on a reception quality of the initial data transmission and a transmission rate class corresponding to a rate strategy field in the initial data transmission.

16. A computer program described in a non-transitory computer-readable format that when executed by a computer system causes the computer system to perform processing controlling communicating operation in a communication environment in which each communication station acquires a transmission right on a medium before carrying out data communication, the computer program comprising:

detecting, at a data receiving communication station, an indication of a presence or absence of subsequent transmit data from another communication station in an initial data transmission; and in response to detecting the indication of the presence of the subsequent transmit data from the another communication station, transmitting, from the data receiving communication station, a clear to send packet (CTS) onto the medium to eliminate the transmission right of other communication stations such that the subsequent transmit data is permitted to be sent, wherein the data receiving communication station determines a transmission rate at which the subsequent data is to be received, the transmission rate being based on a reception quality of the initial data transmission and a transmission rate class corresponding to a rate strategy field in the initial data transmission.

* * * * *